(12) United States Patent
Cai et al.

(10) Patent No.: US 11,499,616 B2
(45) Date of Patent: Nov. 15, 2022

(54) HYDRO-MECHANICAL HYBRID TRANSMISSION DEVICE WITH ENERGY MANAGEMENT MECHANISM

(71) Applicant: JIANGSU UNIVERSITY, Zhenjiang (CN)

(72) Inventors: Yingfeng Cai, Zhenjiang (CN); Zhen Zhu, Zhenjiang (CN); Long Chen, Zhenjiang (CN); Changgao Xia, Zhenjiang (CN); Juncheng Wang, Zhenjiang (CN); Xiang Tian, Zhenjiang (CN); Jiangyi Han, Zhenjiang (CN); Jianguo Zhu, Zhenjiang (CN); LongHui Lai, Zhenjiang (CN); Xing Xu, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 17/296,558

(22) PCT Filed: Aug. 4, 2020

(86) PCT No.: PCT/CN2020/106674
§ 371 (c)(1),
(2) Date: May 25, 2021

(87) PCT Pub. No.: WO2022/016606
PCT Pub. Date: Jan. 27, 2022

(65) Prior Publication Data
US 2022/0213951 A1 Jul. 7, 2022

(30) Foreign Application Priority Data

Jul. 20, 2020 (CN) .......................... 202010697161.6

(51) Int. Cl.
*F16H 47/04* (2006.01)
*F16H 61/00* (2006.01)

(52) U.S. Cl.
CPC ......... *F16H 47/04* (2013.01); *F16H 61/0009* (2013.01); *F16H 2061/0034* (2013.01);
(Continued)

(58) Field of Classification Search
CPC ................. F16H 47/04; F16H 61/0009; F16H 2061/0034; F16H 2200/2007; F16H 2200/2058
See application file for complete search history.

(56) References Cited

U.S. PATENT DOCUMENTS

| 10,955,038 B1 * | 3/2021 | Zhu | ........................ | B60K 6/365 |
| 11,072,231 B1 * | 7/2021 | Zhu | ........................ | B60K 6/365 |

(Continued)

FOREIGN PATENT DOCUMENTS

| CN | 102434647 A | 5/2012 |
| CN | 109281898 A | 1/2019 |

(Continued)

*Primary Examiner* — Tisha D Lewis
(74) *Attorney, Agent, or Firm* — Bayramoglu Law Offices LLC

(57) ABSTRACT

A hydro-mechanical hybrid transmission device with an energy management mechanism includes an input member, a mechanical transmission mechanism, an energy management mechanism, a power output mechanism, an output member, a convergence mechanism, a start mechanism, a hydraulic transmission mechanism, a clutch assembly, and a brake assembly. The clutch assembly connects the input member to the mechanical transmission mechanism, the power output mechanism, and the hydraulic transmission mechanism, and connects the energy management mechanism to the mechanical transmission mechanism and the power output mechanism. The clutch assembly and the brake assembly provide a continuous transmission ratio (Continued)

between the input member and the output member and/or the power output mechanism, between the energy management mechanism and the output member and/or the power output mechanism, and between the energy management mechanism together with the input member and the output member and/or the power output mechanism.

8 Claims, 15 Drawing Sheets

(52) U.S. Cl.
CPC ............... *F16H 2200/2007* (2013.01); *F16H 2200/2058* (2013.01)

(56) References Cited

U.S. PATENT DOCUMENTS

| | | | | |
|---|---|---|---|---|
| 11,155,154 B1* | 10/2021 | Chen | ......................... | B60K 6/48 |
| 2021/0188077 A1* | 6/2021 | Rechenbach | .......... | H02K 7/006 |
| 2021/0331575 A1* | 10/2021 | Zhu | ......................... | F16H 47/04 |
| 2021/0356024 A1* | 11/2021 | Zhu | ......................... | F16H 47/04 |

FOREIGN PATENT DOCUMENTS

| | | | |
|---|---|---|---|
| CN | 109723788 | A | 5/2019 |
| CN | 109723789 | A | 5/2019 |
| CN | 111350799 | A | 6/2020 |
| JP | H07174209 | A | 7/1995 |

\* cited by examiner

A: (-1.00,-1.00)   B: (-1.00,-0.89)   C: (-0.85,-0.85)
D: (0,-0.64)       E: (1,-0.39)       F: (0,-0.28)
G: (-0.25,-0.25)   H: (-1.00,-0.17)   J: (-1.00,0.44)
K: (0,0.72)        L: (1.00,1.00)     M: (0,1.64)
N: (-1.00,2.28)

---

R(H): AI           $R_1$(HM): EH       $R_2$(HM): BE
                   $R_1$(M): F         $R_2$(M): D
F(H): IL           $F_1$(HM): JL       $F_2$(HM): LN
                   $F_1$(M): K         $F_2$(M): M

HYDRO-MECHANICAL HYBRID TRANSMISSION DEVICE WITH ENERGY MANAGEMENT MECHANISM

CROSS REFERENCE TO THE RELATED APPLICATIONS

This application is the national phase entry of International Application No. PCT/CN2020/106674, filed on Aug. 4, 2020, which is based upon and claims priority to Chinese Patent Application No. 202010697161.6, filed on Jul. 20, 2020, the entire contents of which are incorporated herein by reference.

TECHNICAL FIELD

The present invention relates to the field of automatic transmission devices, and in particular, to a hydro-mechanical hybrid transmission device with an energy management mechanism.

BACKGROUND

Hydro-mechanical hybrid transmission devices integrating hydraulic transmission and mechanical transmission are suitable for high-power agricultural or engineering vehicles. Hydraulic transmission that features low speed and high torque is suitable for startup, hydro-mechanical transmission that features efficient stepless speed regulation is suitable for operation, and mechanical transmission that features efficient speed variation is suitable for traveling. A hydro-mechanical hybrid transmission device integrating hydraulic transmission, hydro-mechanical transmission, and mechanical transmission has high engineering application values.

High-power vehicles require a large amount of power mainly because a power source supplies power not only to a transmission system, but also to a power output system to drive other devices to do external work. Therefore, the reasonable distribution of energy to the transmission system and the power output system and the recovery and reuse of residual energy are critical to improve the traction power and transmission efficiency of such vehicles.

SUMMARY

To eliminate the defects in the prior art, the present invention provides a hydro-mechanical hybrid transmission device with an energy management mechanism. The present invention integrates hydraulic transmission, hydro-mechanical transmission, and mechanical transmission, and realizes energy recovery and reuse of transmission mechanisms and a power output mechanism.

The present invention achieves the above objective through the following technical solution.

A hydro-mechanical hybrid transmission device with an energy management mechanism includes an input member, a mechanical transmission mechanism, an energy management mechanism, a power output mechanism, an output member, a convergence mechanism, a start mechanism, a hydraulic transmission mechanism, a clutch assembly, and a brake assembly, wherein the clutch assembly connects the input member to the mechanical transmission mechanism, the power output mechanism, and the hydraulic transmission mechanism, connects an output of the hydraulic transmission mechanism to the mechanical transmission mechanism and the output member, connects an output of the mechanical transmission mechanism to the convergence mechanism, connects the output member to the convergence mechanism, and connects the energy management mechanism to the mechanical transmission mechanism and the power output mechanism; and the clutch assembly and the brake assembly provide a continuous transmission ratio between the input member and the output member and/or the power output mechanism, provide a continuous transmission ratio between the energy management mechanism and the output member and/or the power output mechanism, and provide a continuous transmission ratio between the energy management mechanism together with the input member and the output member and/or the power output mechanism.

Further, transmission modes including hydraulic transmission, hydro-mechanical transmission, and mechanical transmission are provided between the input member and the output member by adjusting a displacement ratio of the hydraulic transmission mechanism and selectively controlling engagement of the clutch assembly and the brake assembly.

Further, the mechanical transmission mechanism includes a front planetary gear mechanism and a middle planetary gear mechanism, a planet carrier of the front planetary gear mechanism is connected to the input member, the planet carrier of the front planetary gear mechanism is connected to a ring gear of the middle planetary gear mechanism, a sun gear of the front planetary gear mechanism is connected to a sun gear of the middle planetary gear mechanism, and the sun gear of the middle planetary gear mechanism is connected to an output end of the hydraulic transmission mechanism; the convergence mechanism includes a rear planetary gear mechanism, a ring gear of the rear planetary gear mechanism is connected to the output member, and the clutch assembly connects a ring gear of the front planetary gear mechanism or a planet carrier of the middle planetary gear mechanism to a sun gear of the rear planetary gear mechanism;

the clutch assembly includes a clutch $C_2$ and a clutch $C_3$; the clutch $C_2$ is used for selectively connecting an input end of the hydraulic transmission mechanism to the input member to achieve synchronous rotation; the clutch $C_3$ is used for selectively connecting the output end of the hydraulic transmission mechanism to the output member to achieve synchronous rotation; and continuous forward or reverse hydraulic transmission is provided between the input member and the output member by adjusting the displacement ratio of the hydraulic transmission mechanism and selectively controlling engagement of the clutch $C_2$ and the clutch $C_3$.

Further, the clutch assembly further includes a clutch $C_1$, a clutch $C_4$, a clutch $C_5$, and a clutch $C_6$; the clutch $C_1$ is used for selectively connecting the input member to the planet carrier of the front planetary gear mechanism to achieve synchronous rotation; the clutch $C_4$ is used for selectively connecting the planet carrier of the middle planetary gear mechanism to the sun gear of the rear planetary gear mechanism to achieve synchronous rotation; the clutch $C_5$ is used for selectively connecting the ring gear of the front planetary gear mechanism to the sun gear of the rear planetary gear mechanism to achieve synchronous rotation; the clutch $C_6$ is used for selectively connecting the ring gear of the rear planetary gear mechanism to the sun gear of the rear planetary gear mechanism to achieve synchronous rotation; the brake assembly includes a brake $B_2$, and the brake $B_2$ is used for selectively connecting a planet carrier of the rear planetary gear mechanism to a fixed member; and continuous forward or reverse hydro-mechanical transmission is provided between the input member and the output member by adjusting the displacement ratio of the hydraulic transmission mechanism and selectively controlling engagement of the clutch $C_1$, the clutch $C_2$, the clutch $C_4$, the clutch $C_5$, the clutch $C_6$, and the brake $B_2$.

Further, the clutch $C_1$, the clutch $C_2$, the clutch $C_4$, and the clutch $C_6$ are engaged, the clutch $C_1$, the clutch $C_2$, the clutch $C_5$, and the clutch $C_6$ are engaged, the clutch $C_1$, the clutch $C_2$, the clutch $C_4$, and the brake $B_2$ are engaged, and the clutch $C_1$, the clutch $C_2$, the clutch $C_5$, and the brake $B_2$ are engaged, to respectively provide different forward or reverse hydro-mechanical transmission between the input member and the output member.

Further, the brake assembly further includes a brake $B_1$; the brake $B_1$ is used for selectively connecting the output end of the hydraulic transmission mechanism to the fixed member; and the clutch $C_1$, the clutch $C_4$, the clutch $C_6$, and the brake $B_1$ are engaged, the clutch $C_1$, the clutch $C_5$, the clutch $C_6$, and the brake $B_1$ are engaged, the clutch $C_1$, the clutch $C_4$, the brake $B_1$, and the brake $B_2$ are engaged, and the clutch $C_1$, the clutch $C_5$, the brake $B_1$, and the brake $B_2$ are engaged, to respectively provide different forward or reverse mechanical transmission between the input member and the output member.

Further, the energy management mechanism includes a pump/motor mechanism, a solenoid directional valve $V_1$, a pilot-operated proportional relief valve $V_2$, an accumulator $A_1$, a solenoid directional valve $V_3$, a pilot-operated proportional relief valve $V_4$, and an accumulator $A_2$; the pump/motor mechanism is connected to the accumulator $A_1$ and the accumulator $A_2$; the solenoid directional valve $V_1$ is used for controlling the pump/motor mechanism to be connected to the accumulator $A_1$, the pilot-operated proportional relief valve $V_2$ is mounted between the pump/motor mechanism and the accumulator $A_1$, the solenoid directional valve $V_3$ is used for controlling the pump/motor mechanism to be connected to the accumulator $A_2$, and the pilot-operated proportional relief valve $V_4$ is mounted between the pump/motor mechanism and the accumulator $A_2$; the clutch assembly further includes a clutch $C_7$, a clutch $C_8$, and a clutch $C_9$, the clutch $C_7$ is used for selectively connecting the pump/motor mechanism to the planet carrier of the front planetary gear mechanism to achieve synchronous rotation; the clutch $C_9$ is used for selectively connecting the pump/motor mechanism to the power output mechanism to achieve synchronous rotation; and the clutch $C_5$ is used for selectively connecting the input member to the power output mechanism to achieve synchronous rotation.

Further, when the output member is braked, the clutch $C_7$, the brake $B_1$, and the clutch $C_4$ are engaged, or the clutch $C_7$, the brake $B_1$, and the clutch $C_5$ are engaged, to respectively provide a continuous transmission ratio between the output member and the pump/motor mechanism; and the solenoid directional valve $V_1$ and the solenoid directional valve $V_3$ are selectively controlled to input, into the accumulator $A_1$ or/and the accumulator $A_2$, energy produced when the output member is braked;

when the power output mechanism is braked, the clutch $C_9$ is engaged to provide a continuous transmission ratio between the power output mechanism and the pump/motor mechanism; and the solenoid directional valve $V_1$ and the solenoid directional valve $V_3$ are selectively controlled to input, into the accumulator $A_1$ or/and the accumulator $A_2$, energy produced when the power output mechanism is braked.

Further, the solenoid directional valve $V_1$ and/or the solenoid directional valve $V_3$ are selectively controlled to make the accumulator $A_1$ or/and the accumulator $A_2$ serve as an output of the energy management mechanism;

the clutch $C_1$, the clutch $C_2$, the clutch $C_3$, and the clutch $C_7$ are engaged to provide a continuous transmission ratio between the energy management mechanism and the output member and provide a continuous transmission ratio between the energy management mechanism and the input member and the output member;

the clutch $C_9$ is engaged to provide a continuous transmission ratio between the energy management mechanism and the power output mechanism;

the clutch $C_5$ and the clutch $C_9$ are engaged to provide a continuous transmission ratio between the input member together with the energy management mechanism and the power output mechanism.

Further, the clutch $C_8$ and the clutch $C_9$ are engaged and the clutch $C_1$ and the clutch $C_7$ are engaged, to respectively provide a continuous transmission ratio between the input member and the pump/motor mechanism; and the solenoid directional valve $V_1$ and the solenoid directional valve $V_3$ are selectively controlled to input energy of the input member into the accumulator $A_1$ or/and the accumulator $A_2$.

The present invention has the following beneficial effects:

1. The hydro-mechanical hybrid transmission device with an energy management mechanism of the present invention is a multi-mode hydro-mechanical hybrid transmission device that integrates hydraulic transmission, hydro-mechanical transmission, and mechanical transmission and meets the requirements of different working conditions.

2. The hydro-mechanical hybrid transmission device with an energy management mechanism of the present invention adopts different accumulation systems to increase the degree of freedom of the energy management mechanism. The energy management mechanism can drive the transmission mechanism or the power output mechanism alone or together with an engine.

3. According to the hydro-mechanical hybrid transmission device with an energy management mechanism of the present invention, the energy management mechanism stores energy from the engine, and then releases the energy to meet the power requirements of extreme working conditions together with the engine.

4. According to the hydro-mechanical hybrid transmission device with an energy management mechanism of the present invention, the rotation direction of the pump/motor mechanism in the energy management mechanism is controlled by controlling the engagement of the clutch $C_6$ or the brake $B_2$ in the convergence mechanism or changing the positive or negative sign of the displacement ratio of the hydraulic transmission mechanism.

1. input shaft; 2. mechanical transmission mechanism; 21. clutch $C_1$; 22. front planetary gear planet carrier; 23. front planetary gear sun gear; 24. middle planetary gear sun gear; 25. middle planetary gear ring gear; 26. middle planetary gear planet carrier; 27. front planetary gear ring gear; 28. clutch $C_4$; 29. clutch $C_5$; 3. energy management mechanism; 31. transmission mechanism and energy management mechanism gear pair; 32. clutch $C_7$; 33. pump/motor mechanism; 34. solenoid directional valve $V_1$; 35. pilot-operated proportional relief valve $V_2$; 36. accumulator $A_1$; 37. solenoid directional valve $V_3$; 38. pilot-operated proportional relief valve $V_4$; 39. accumulator $A_2$; 310. power output mechanism and energy management mechanism gear pair; 311. clutch $C_9$; 4. power output mechanism; 41. power output gear pair; 42. clutch $C_8$; 43. power output shaft; 5. output shaft; 6. convergence mechanism; 61. rear planetary gear sun gear; 62. rear planetary gear planet carrier; 63. rear planetary gear ring gear; 64. clutch $C_6$; 65. brake $B_2$; 66. mechanical transmission mechanism and convergence mechanism gear pair; 7. start mechanism; 71. start mechanism gear pair; 72. clutch $C_5$; 8. hydraulic transmission mechanism; 81. clutch $C_2$; 82. hydraulic transmission input gear pair; 83. pump input shaft; 84. variable displacement pump; 85. quantitative motor; 86. motor output shaft; 87. hydraulic transmission output gear pair; 88. brake $B_1$.

DETAILED DESCRIPTION OF THE EMBODIMENTS

The present invention is further described below with reference to the accompanying drawings and specific embodiments, but the protection scope of the present invention is not limited thereto.

Figure 1:
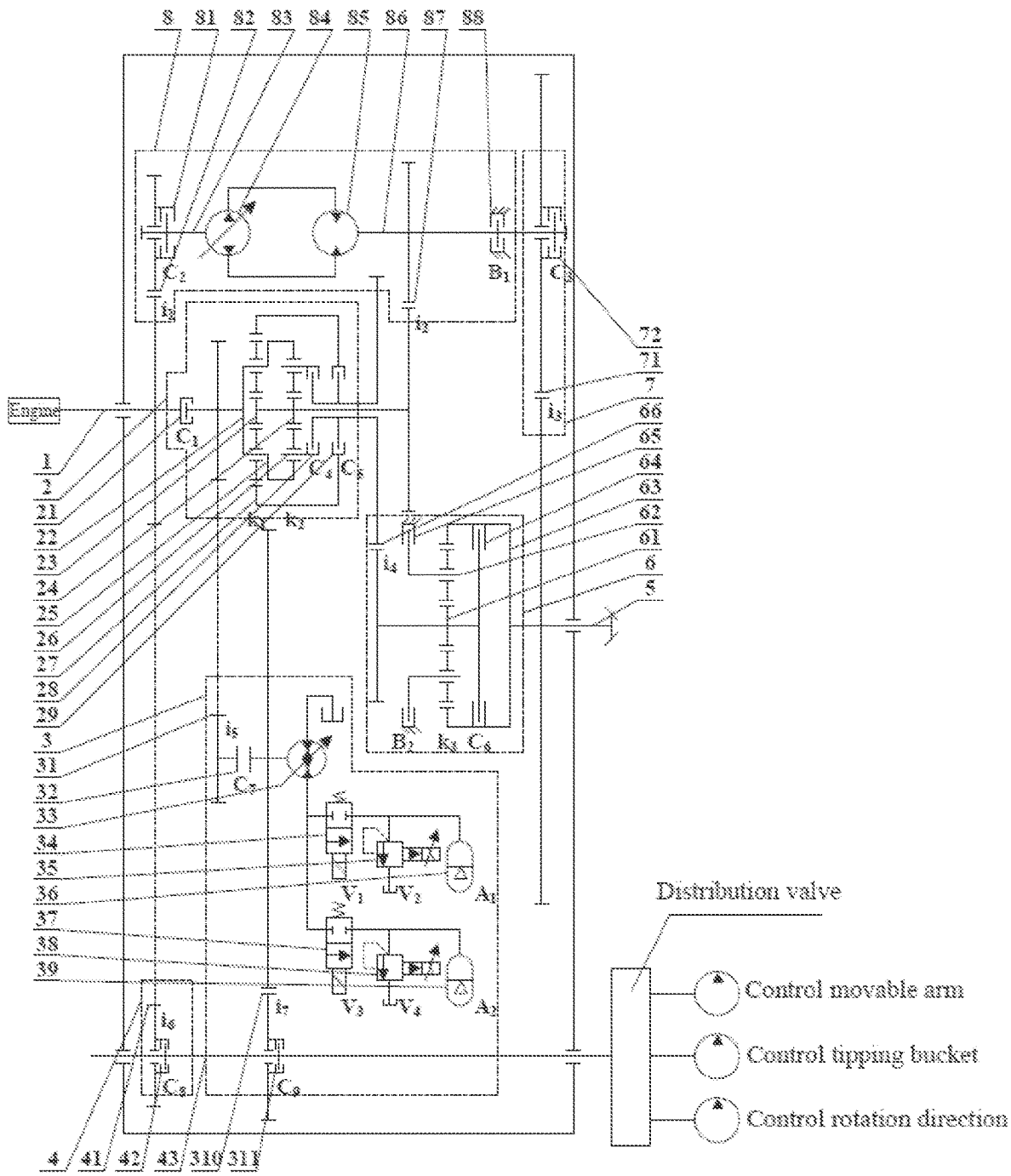
FIG. 1 is a schematic structural diagram of the present invention.

As shown in FIG. 1, the hydro-mechanical hybrid transmission device with an energy management mechanism of the present invention includes an input shaft 1, a mechanical transmission mechanism 2, an energy management mechanism 3, a power output mechanism 4, an output shaft 5, a convergence mechanism 6, a start mechanism 7, a hydraulic transmission mechanism 8, a clutch assembly, and a brake assembly.

The hydraulic transmission mechanism 8 includes a clutch $C_2$ 81, a hydraulic transmission input gear pair 82, a pump input shaft 83, a variable displacement pump 84, a quantitative motor 85, a motor output shaft 86, a hydraulic transmission output gear pair 87, and a brake $B_1$ 88. The pump input shaft 83 is connected to the input shaft 1 through the hydraulic transmission input gear pair 82, the motor output shaft 86 of the quantitative motor 85 is connected to a middle planetary gear sun gear 24 through the hydraulic transmission output gear pair 87, the motor output shaft 86 of the quantitative motor 85 is also connected to the output shaft 5 through a start mechanism gear pair 71 of the start mechanism 7, and the variable displacement pump 84 is used for providing hydraulic energy to the quantitative motor 85. The brake $B_1$ 88 is used for selectively connecting the motor output shaft 86 to a fixed member. The clutch $C_2$ 81 is used for selectively connecting the pump input shaft 83 of the hydraulic transmission mechanism 8 to the input shaft 1 through the hydraulic transmission input gear pair 82 to achieve synchronous rotation. The start mechanism 7 includes the start mechanism gear pair 71 and a clutch $C_3$ 72. The clutch $C_3$ 72 is used for selectively connecting the motor output shaft 86 to the output shaft 5 through the start mechanism gear pair 71 to achieve synchronous rotation. The pump input shaft 83 forces the variable displacement pump 84 to work. By changing the angle of a swashplate, the variable displacement pump 84 forces the quantitative motor 85 to work. Then, the motor output shaft 86 outputs power to the mechanical transmission mechanism 2 or the start mechanism 7.

The mechanical transmission mechanism 2 includes a clutch $C_1$ 21, a front planetary gear planet carrier 22, a front planetary gear sun gear 23, the middle planetary gear sun gear 24, a middle planetary gear ring gear 25, a middle planetary gear planet carrier 26, a front planetary gear ring gear 27, a clutch $C_4$ 28, and a clutch $C_5$ 29. The front planetary gear planet carrier 22, the front planetary gear sun gear 23, and the front planetary gear ring gear 27 form a front planetary gear mechanism. The middle planetary gear sun gear 24, the middle planetary gear ring gear 25, and the middle planetary gear planet carrier 26 form a middle planetary gear mechanism. The front planetary gear planet carrier 22 serves as an input end of the mechanical transmission mechanism 2 and is connected to the input shaft 1 through the clutch $C_1$ 21. The front planetary gear planet carrier 22 is connected to the middle planetary gear ring gear 25. The front planetary gear sun gear 23 is connected to the middle planetary gear sun gear 24, and is connected to the motor output shaft 86 through the hydraulic transmission output gear pair 87. The front planetary gear ring gear 27 and the middle planetary gear planet carrier 26 can be respectively connected to an input end of the convergence mechanism 6 through the clutch $C_5$ 29 and the clutch $C_4$ 28. The convergence mechanism 6 includes a rear planetary gear sun gear 61, a rear planetary gear planet carrier 62, a rear planetary gear ring gear 63, a clutch $C_6$ 64, a brake $B_2$ 65, and a mechanical transmission mechanism and convergence mechanism gear pair 66. The rear planetary gear sun gear 61, the rear planetary gear planet carrier 62, and the rear planetary gear ring gear 63 form a rear planetary gear mechanism. The rear planetary gear ring gear 63 is connected to the output shaft 5. The clutch $C_1$ 21 is used for selectively connecting the input shaft 1 to the front planetary gear planet carrier 22. The clutch $C_4$ 28 is used for selectively connecting the middle planetary gear planet carrier 26 to the rear planetary gear sun gear 61 through the mechanical transmission mechanism and convergence mechanism gear pair 66 to achieve synchronous rotation. The clutch $C_5$ 29 is used for selectively connecting the front planetary gear ring gear 27 to the rear planetary gear sun gear 61 through the mechanical transmission mechanism and convergence mechanism gear pair 66 to achieve synchronous rotation. The clutch $C_6$ 64 is used for selectively connecting the rear planetary gear sun gear 61 to the rear planetary gear ring gear 63. The brake $B_2$ 65 is used for selectively fixing the rear planetary gear planet carrier 62.

The energy management mechanism 3 includes a transmission mechanism and energy management mechanism gear pair 31, a clutch $C_7$ 32, a pump/motor mechanism 33, a solenoid directional valve $V_1$ 34, a pilot-operated proportional relief valve $V_2$ 35, an accumulator $A_1$ 36, a solenoid directional valve $V_3$ 37, a pilot-operated proportional relief valve $V_4$ 38, an accumulator $A_2$ 39, a power output mechanism and energy management mechanism gear pair 310, and a clutch $C_9$ 311. The pump/motor mechanism 33 is a device capable of switching between functions of a pump and a hydraulic motor, that is, when mechanical energy is input into the pump/motor mechanism 33, the pump/motor mechanism 33 outputs hydraulic energy, and when hydraulic energy is input into the pump/motor mechanism 33, the pump/motor mechanism 33 outputs mechanical energy. The pump/motor mechanism 33 is connected to the front planetary gear planet carrier 22 through the transmission mechanism and energy management mechanism gear pair 31. The pump/motor mechanism 33 is connected to the power output mechanism 4 through the power output mechanism and energy management mechanism gear pair 310. The solenoid directional valve $V_1$ 34, the pilot-operated proportional relief valve $V_2$ 35, and the accumulator $A_1$ 36 are connected to form a first accumulation system. The solenoid directional valve $V_3$ 37, the pilot-operated proportional relief valve $V_4$ 38, and the accumulator $A_2$ 39 are connected to form a second accumulation system. The first accumulation system and the second accumulation system are connected in parallel and are connected to the pump/motor mechanism 33. The power output mechanism 4 includes a power output gear pair 41, a clutch $C_8$ 42, and a power output shaft 43. The power output shaft 43 is connected to the input shaft 1 through the power output gear pair 41. The clutch $C_7$ 32 is used for selectively connecting the pump/motor mechanism 33 to the front planetary gear planet carrier 22 through the transmission mechanism and energy management mechanism gear pair 31 to achieve synchronous rotation. The clutch $C_9$ 311 is used for selectively connecting the pump/motor mechanism 33 to the power output shaft 43 through the power output mechanism and energy management mechanism gear pair 310 to achieve synchronous rotation. The clutch $C_8$ 42 is used for selectively connecting the input shaft 1 to the power output shaft 43 through the power output gear pair 41 to achieve synchronous rotation.

Figure 2:
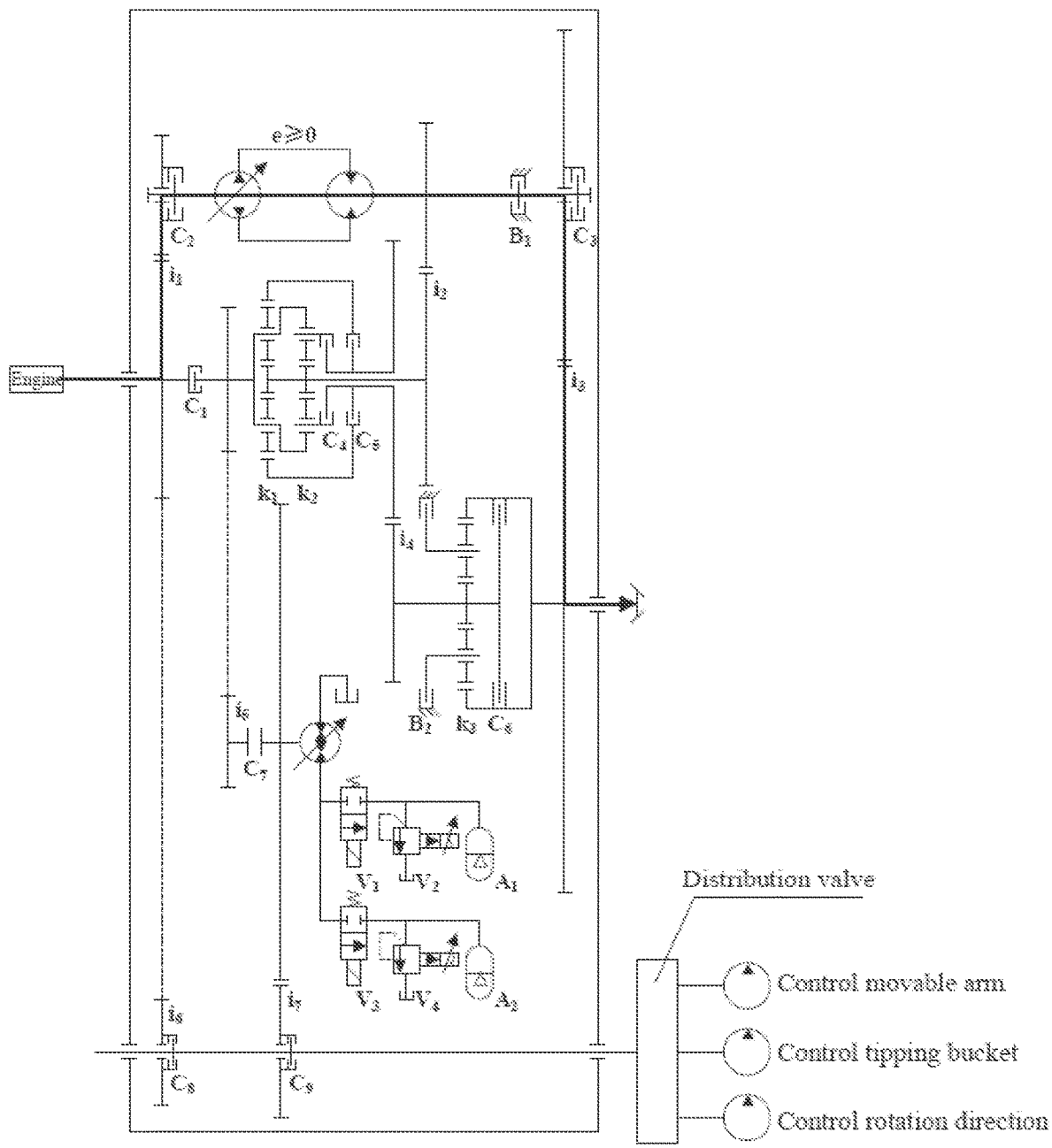
FIG. 2 is a schematic diagram showing the power flow in an F(H) gear in the present invention.
Figure 5:
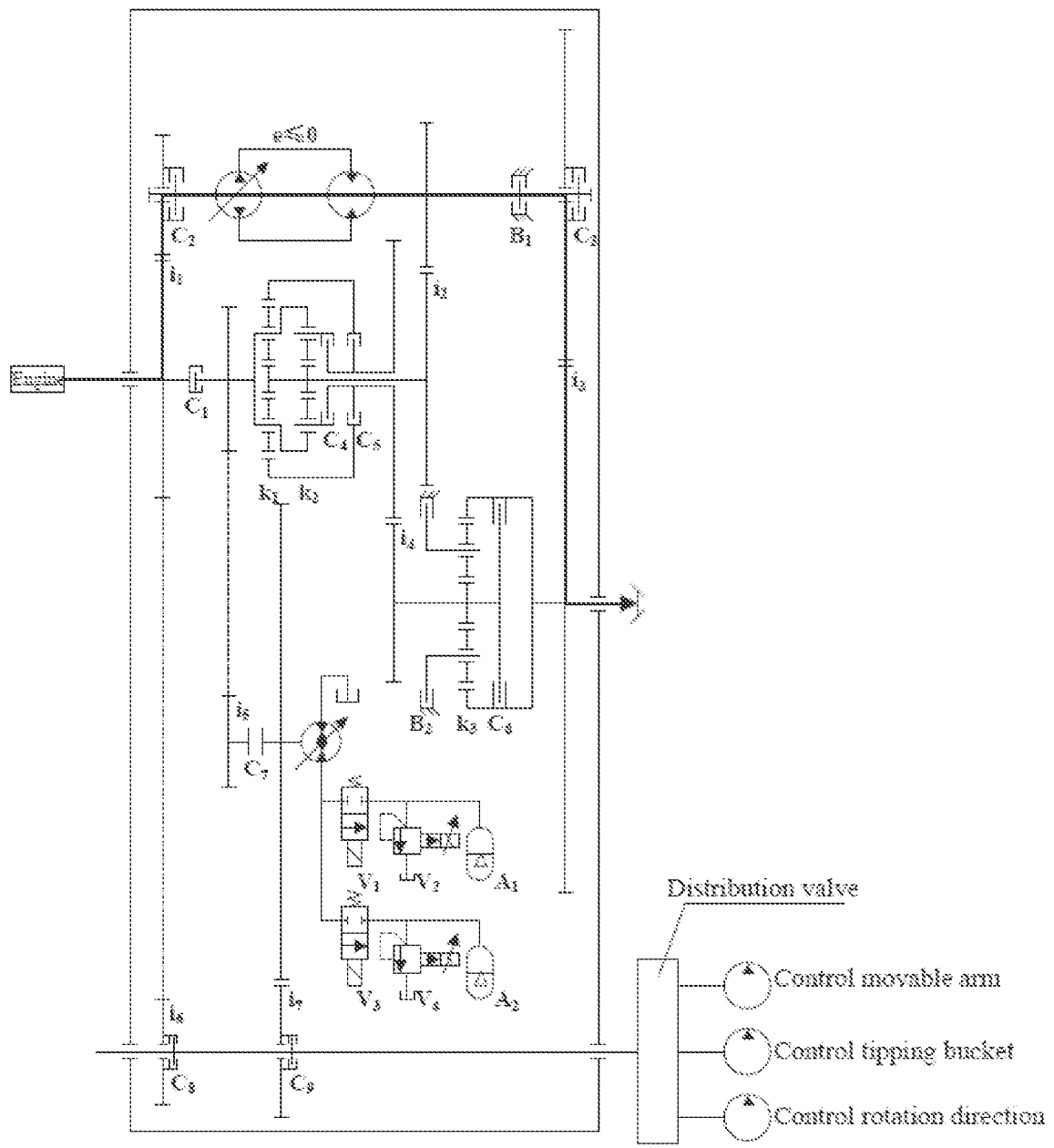
FIG. 5 is a schematic diagram showing the power flow in an R(H) gear in the present invention.

Transmission modes including hydraulic transmission, hydro-mechanical transmission, and mechanical transmission are provided between an input member and an output member by adjusting a displacement ratio of the hydraulic transmission mechanism 8 and selectively controlling engagement of the clutch assembly and the brake assembly. Specific examples are given below for illustration with reference to Table 1:

As shown in FIG. 2 and FIG. 5, the hydraulic transmission includes forward hydraulic transmission F(H) and reverse hydraulic transmission R(H).

The power flow in an F(H) gear in the present invention is shown in FIG. 2. When the clutch $C_2$ 81 and the clutch $C_3$ 72 are engaged, power supplied by an engine passes through the input shaft 1, the hydraulic transmission mechanism 8, and the start mechanism 7 and is output from the output shaft 5, and when the displacement ratio of the hydraulic transmission mechanism 8 is positive, the F(H) gear is obtained. In this case, the rotation speeds of the output shaft and the engine are in the following relationship:

$$n_0 = \frac{e}{i_1 i_3} n_I, e \in [0, 1]$$

wherein $n_o$ is the rotation speed of the output shaft, $n_I$ is the rotation speed of the input shaft, e is the displacement ratio of the hydraulic transmission mechanism, $i_1$ is a transmission ratio of the hydraulic transmission input gear pair 82, and $i_3$ is a transmission ratio of the start mechanism gear pair 71.

The power flow in an R(H) gear in the present invention is shown in FIG. 5. When the clutch $C_2$ 81 and the clutch $C_3$ 72 are engaged, power supplied by the engine passes through the input shaft 1, the hydraulic transmission mechanism 8, and the start mechanism 7 and is output from the output shaft 5, and when the displacement ratio of the hydraulic transmission mechanism 8 is negative, the R(H) gear is obtained. In this case, the rotation speeds of the output shaft and the engine are in the following relationship:

$$n_0 = \frac{e}{i_1 i_3} n_I, e \in [-1, 0].$$

As shown in FIG. 3, FIG. 4, FIG. 6, and FIG. 7, the hydro-mechanical transmission includes forward hydro-mechanical transmission $F_1$(HM), forward hydro-mechanical transmission $F_2$(HM), reverse hydro-mechanical transmission $R_1$(HM), and reverse hydro-mechanical transmission $R_2$(HM).

Figure 3:
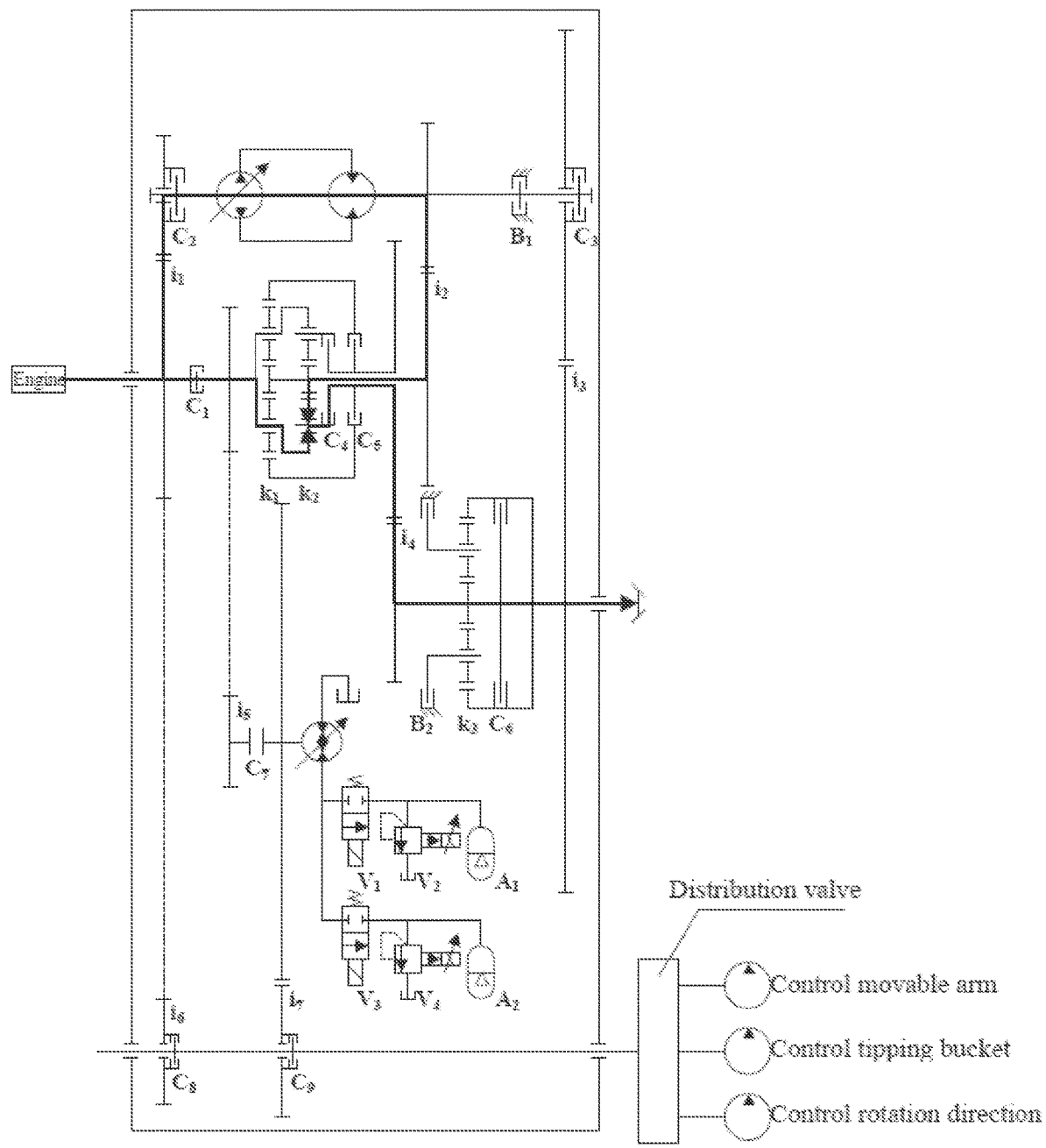
FIG. 3 is a schematic diagram showing the power flow in an $F_1$(HM) gear in the present invention.

The power flow in an $F_1$(HM) gear in the present invention is shown in FIG. 3. When the clutch $C_1$ 21, the clutch $C_2$ 81, the clutch $C_4$ 28, and the clutch $C_6$ 64 are engaged, power supplied by the engine is split at the input shaft 1: one part of the power is transmitted through the front planetary gear planet carrier 22 to the middle planetary gear ring gear 25, while the other part of the power is transmitted through the hydraulic transmission mechanism 8 to the middle planetary gear sun gear 24; the mechanical power arriving in the middle planetary gear ring gear 25 and the hydraulic power arriving in the middle planetary gear sun gear 24 are converged at the middle planetary gear planet carrier 26 and then transmitted through the mechanical transmission mechanism and convergence mechanism gear pair 66 to the convergence mechanism 6; therefore, the convergence mechanism 6 is connected as a whole and the power is output from the output shaft 5. In this case, the rotation speeds of the output shaft and the engine are in the following relationship:

$$n_0 = \frac{k_2 + \frac{e}{i_1 i_2}}{k_2 + 1} n_I, e \in [-1, 1]$$

wherein $i_2$ is a transmission ratio of the hydraulic transmission output gear pair and $k_2$ is a characteristic parameter of the middle planetary gear mechanism.

Figure 4:
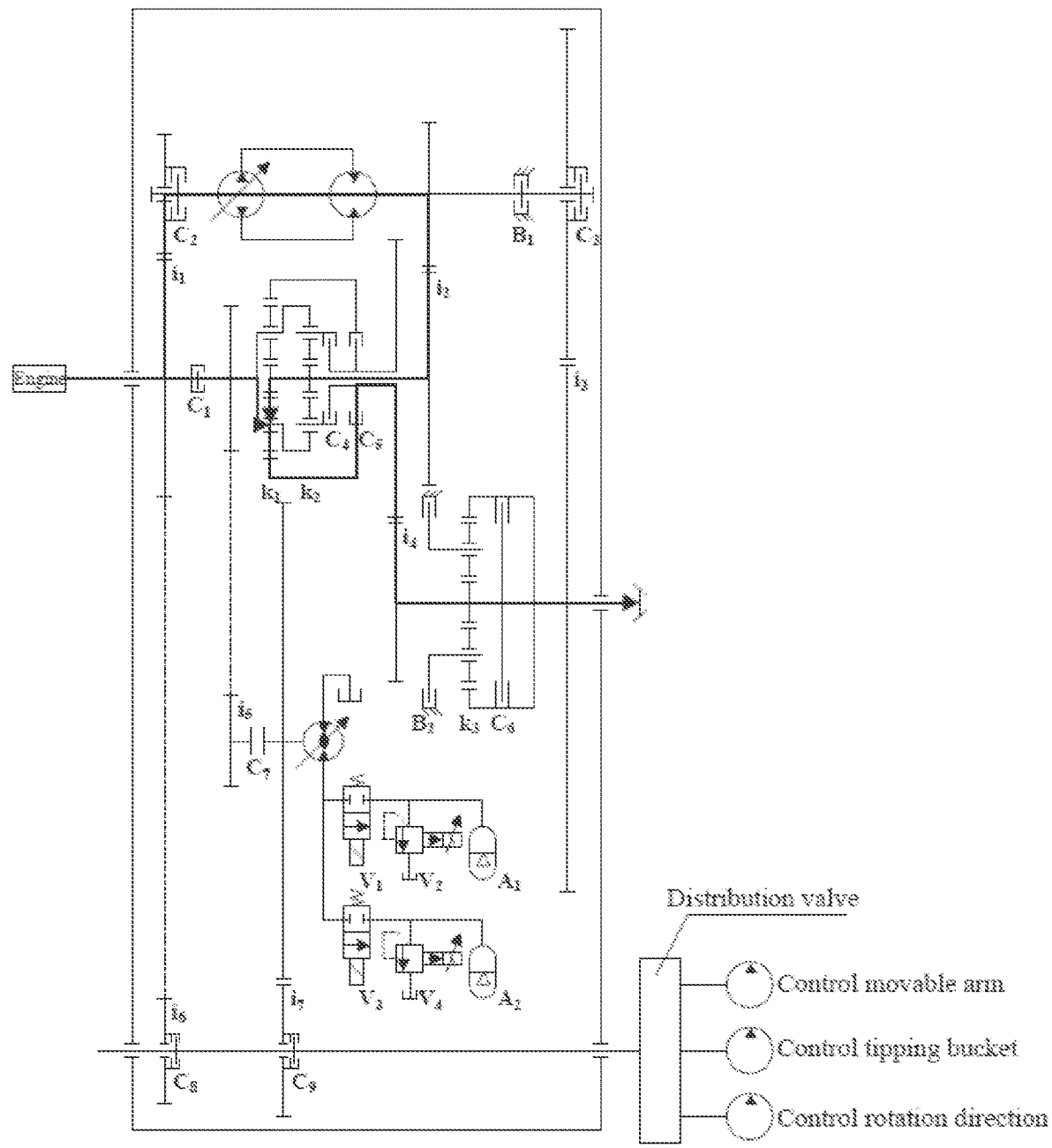
FIG. 4 is a schematic diagram showing the power flow in an $F_2$(HM) gear in the present invention.

The power flow in an $F_2$(HM) gear in the present invention is shown in FIG. 4. When the clutch $C_1$ 21, the clutch $C_2$ 81, the clutch $C_5$ 29, and the clutch $C_6$ 64 are engaged, power supplied by the engine is split at the input shaft 1: one part of the power is directly transmitted to the front planetary gear planet carrier 22, while the other part of the power is transmitted through the hydraulic transmission mechanism 8 to the front planetary gear sun gear 23; the mechanical power arriving in the front planetary gear planet carrier 22 and the hydraulic power arriving in the front planetary gear sun gear 23 are converged at the front planetary gear ring gear 27 and then transmitted through the mechanical transmission mechanism and convergence mechanism gear pair 66 to the convergence mechanism 6; therefore, the convergence mechanism 6 is connected as a whole and the power is output from the output shaft 5. In this case, the rotation speeds of the output shaft and the engine are in the following relationship:

$$n_0 = \frac{(k_1+1) - \frac{e}{i_1 i_2}}{k_1} n_I, e \in [-1, 1]$$

wherein $k_1$ is a characteristic parameter of the front planetary gear mechanism.

Figure 6:
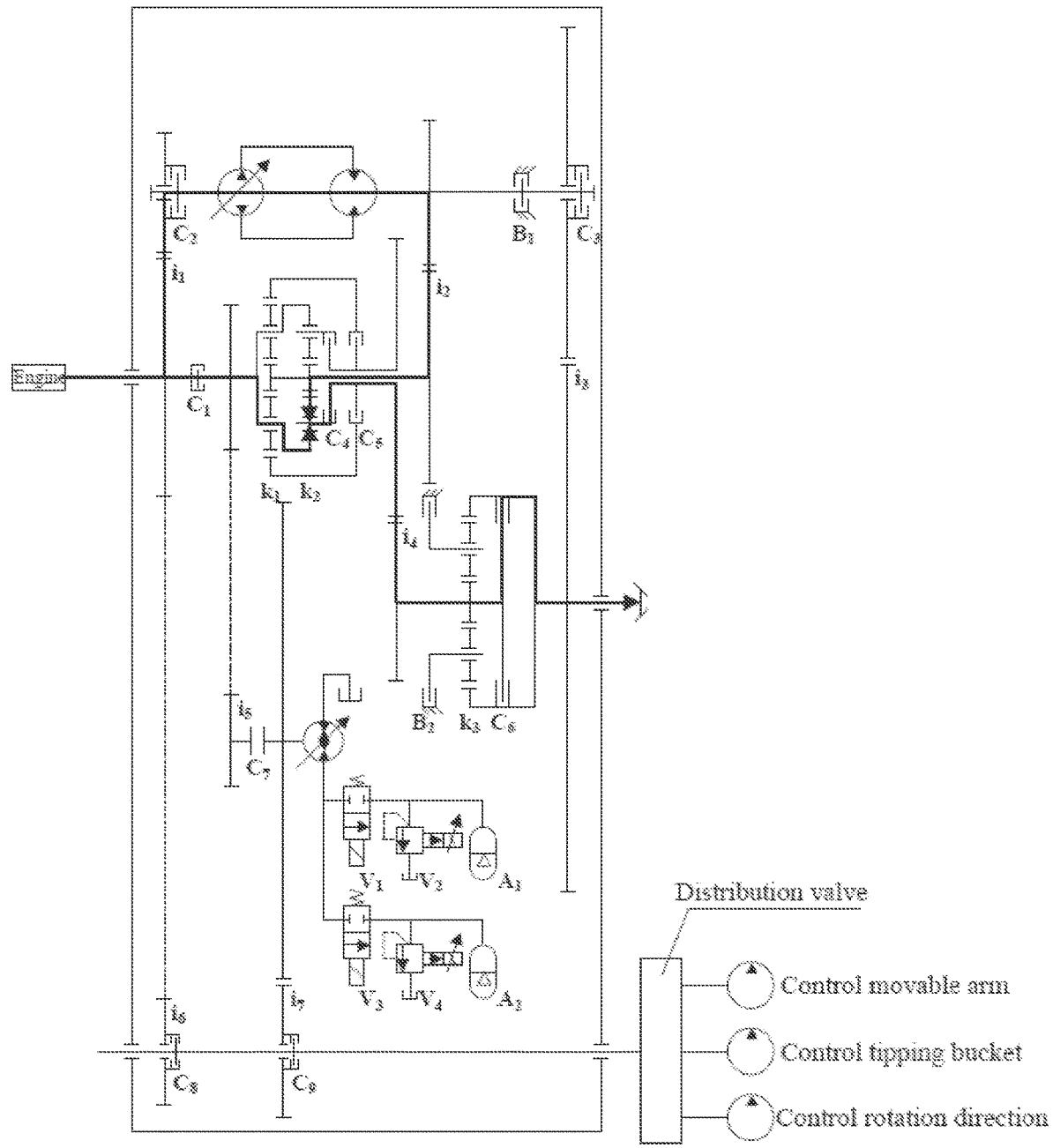
FIG. 6 is a schematic diagram showing the power flow in an $R_1$(HM) gear in the present invention.

The power flow in an $R_1$(IM) gear in the present invention is shown in FIG. 6. When the clutch $C_1$ 21, the clutch $C_2$ 81, the clutch $C_4$ 28, and the brake $B_2$ 65 are engaged, power supplied by the engine is split at the input shaft 1: one part of the power is transmitted through the front planetary gear planet carrier 22 to the middle planetary gear ring gear 25, while the other part of the power is transmitted through the hydraulic transmission mechanism 8 to the middle planetary gear sun gear 24, the mechanical power arriving in the middle planetary gear ring gear 25 and the hydraulic power arriving in the middle planetary gear sun gear 24 are converged at the middle planetary gear planet carrier 26; then the power is transmitted through the mechanical transmission mechanism and convergence mechanism gear pair 66 to the rear planetary gear sun gear 61, and is transmitted through the rear planetary gear ring gear 63 and output from the output shaft 5. In this case, the rotation speeds of the output shaft and the engine are in the following relationship:

$$n_0 \frac{k_2 + \frac{e}{i_1 i_2}}{-(k_2+1) k_3} n_I, e \in [-1, 1]$$

wherein $k_3$ is a characteristic parameter of the rear planetary gear mechanism.

Figure 7:
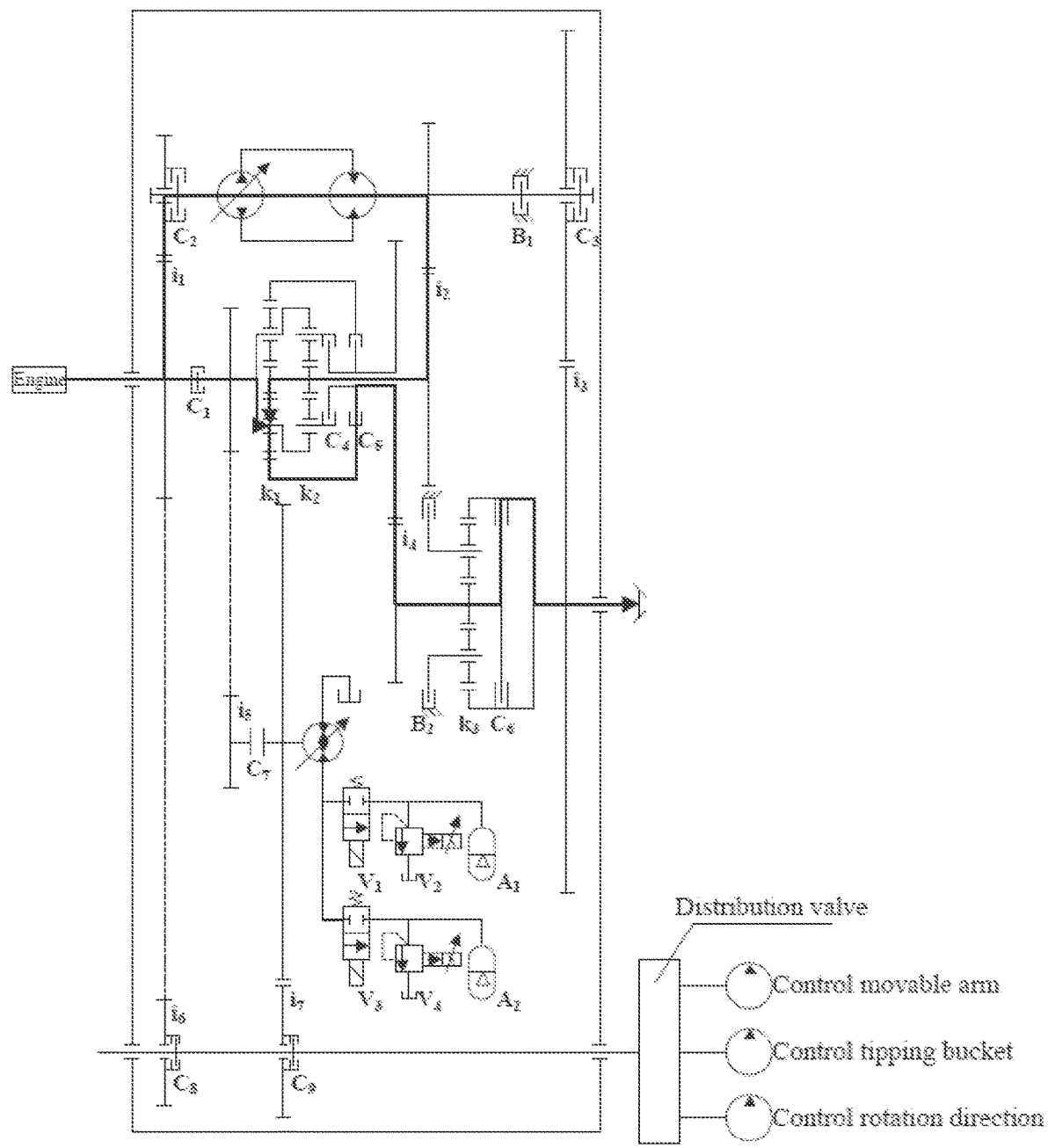
FIG. 7 is a schematic diagram showing the power flow in an $R_2$(HM) gear in the present invention.

The power flow in an $R_2$(HM) gear in the present invention is shown in FIG. 7. When the clutch $C_1$ 21, the clutch $C_2$ 81, the clutch $C_5$ 29, and the brake $B_2$ 65 are engaged, power supplied by the engine is split at the input shaft 1: one part of the power is directly transmitted to the front planetary gear planet carrier 22, while the other part of the power is transmitted through the hydraulic transmission mechanism 8 to the front planetary gear sun gear 23; the mechanical power arriving in the front planetary gear planet carrier 22 and the hydraulic power arriving in the front planetary gear sun gear 23 are converged at the front planetary gear ring gear 27; then the power is transmitted through the mechanical transmission mechanism and convergence mechanism gear pair 66 to the rear planetary gear sun gear 61, and is transmitted through the rear planetary gear ring gear 63 and output from the output shaft 5. In this case, the rotation speeds of the output shaft and the engine are in the following relationship:

$$n_0 = \frac{(k_1+1) - \frac{e}{i_1 i_2}}{-k_1 k_3} n_I, e \in [-1, 1]$$

The mechanical transmission includes forward mechanical transmission $F_1$(M), forward mechanical transmission $F_2$(M), reverse mechanical transmission $R_1$(M), and reverse mechanical transmission $R_2$(M).

The power flow in an $F_1$(M) gear in the present invention is also shown in FIG. 3, and the hydraulic path does not transmit power. When the clutch $C_1$ 21, the clutch $C_4$ 28, the clutch $C_6$ 64, and the brake $B_1$ 88 are engaged, power supplied by the engine passes through the input shaft 1, the front planetary gear planet carrier 22, the middle planetary gear ring gear 25, the middle planetary gear planet carrier 26, the mechanical transmission mechanism and convergence mechanism gear pair 66, and the convergence mechanism 6 and is output from the output shaft 5. In this case, the rotation speeds of the output shaft and the engine are in the following relationship:

$$n_0 = \frac{k_2}{k_2+1} n_I.$$

The power flow in an $F_2$(M) gear in the present invention is also shown in FIG. 4, and the hydraulic path does not transmit power. When the clutch $C_1$ 21, the clutch $C_5$ 29, the clutch $C_6$ 64, and the brake $B_1$ 88 are engaged, power supplied by the engine passes through the input shaft 1, the front planetary gear planet carrier 22, the front planetary gear ring gear 27, the mechanical transmission mechanism and convergence mechanism gear pair 66, and the convergence mechanism 6 and is output from the output shaft 5. In this case, the rotation speeds of the output shaft and the engine are in the following relationship:

$$n_0 = \frac{(k_1+1)}{k_1} n_I.$$

The power flow in an $R_1$(M) gear in the present invention is also shown in FIG. 6, and the hydraulic path does not transmit power. When the clutch $C_1$ 21, the clutch $C_4$ 28, the brake $B_1$ 88, and the brake $B_2$ 65 are engaged, power supplied by the engine passes through the input shaft 1, the front planetary gear planet carrier 22, the middle planetary gear ring gear 25, the middle planetary gear planet carrier 26, the mechanical transmission mechanism and convergence mechanism gear pair 66, the rear planetary gear sun gear 61, and the rear planetary gear ring gear 63 and is output from the output shaft 5. In this case, the rotation speeds of the output shaft and the engine are in the following relationship:

$$n_0 = \frac{k_2}{-(k_2+1)k_3} n_I.$$

The power flow in an $R_2(M)$ gear in the present invention is also shown in FIG. 7, and the hydraulic path does not transmit power. When the clutch $C_1$ 21, the clutch $C_5$ 29, the brake $B_1$ 88, and the brake $B_2$ 65 are engaged, power supplied by the engine passes through the input shaft 1, the front planetary gear planet carrier 22, the front planetary gear ring gear 27, the mechanical transmission mechanism and convergence mechanism gear pair 66, the rear planetary gear sun gear 61, and the rear planetary gear ring gear 63 and is output from the output shaft 5. In this case, the rotation speeds of the output shaft and the engine are in the following relationship:

$$n_0 = \frac{(k_1+1)}{-k_1 k_3} n_I.$$

TABLE 1

Engagement/disengagement of each component

| Mode | Direction | B₁ | B₂ | C₁ | C₂ | C₃ | C₄ | C₅ | C₆ | Gear |
|---|---|---|---|---|---|---|---|---|---|---|
| Hydraulic | Forward | Δ | Δ | Δ | ▲ | ▲ | Δ | Δ | ▲ | F(H) |
| Hydro- | | Δ | Δ | ▲ | ▲ | Δ | ▲ | Δ | ▲ | F₁(HM) |
| mechanical | | Δ | Δ | ▲ | ▲ | Δ | Δ | ▲ | ▲ | F₂(HM) |
| Mechanical | | ▲ | Δ | ▲ | Δ | Δ | ▲ | Δ | ▲ | F₁(M) |
| | | ▲ | Δ | ▲ | Δ | Δ | Δ | ▲ | ▲ | F₂(M) |
| Hydraulic | Reverse | Δ | Δ | Δ | ▲ | ▲ | Δ | Δ | Δ | R(H) |
| Hydro- | | Δ | ▲ | ▲ | ▲ | Δ | ▲ | Δ | Δ | R₁(HM) |
| mechanical | | Δ | ▲ | ▲ | ▲ | Δ | Δ | ▲ | Δ | R₂(HM) |
| Mechanical | | ▲ | ▲ | ▲ | Δ | Δ | ▲ | Δ | Δ | R₁(M) |
| | | ▲ | ▲ | ▲ | Δ | Δ | Δ | ▲ | Δ | R₂(M) |

In Table 1. 1. B stands for brake, C stands for clutch, F stands for forward gear, R stands for reverse gear, H stands for hydraulic transmission, M stands for mechanical transmission, and HM stands for hydro-mechanical hybrid transmission.

2. ▲ stands for engagement of a gear-shift component, and Δ stands for disengagement of a gear-shift component.

In an embodiment, the following parameters are selected: $i_1 i_2 = 1.00$, $i_1 i_3 = 1.00$, $k_1 = 1.56$, $k_2 = k_3 = 2.56$.

Figure 8:
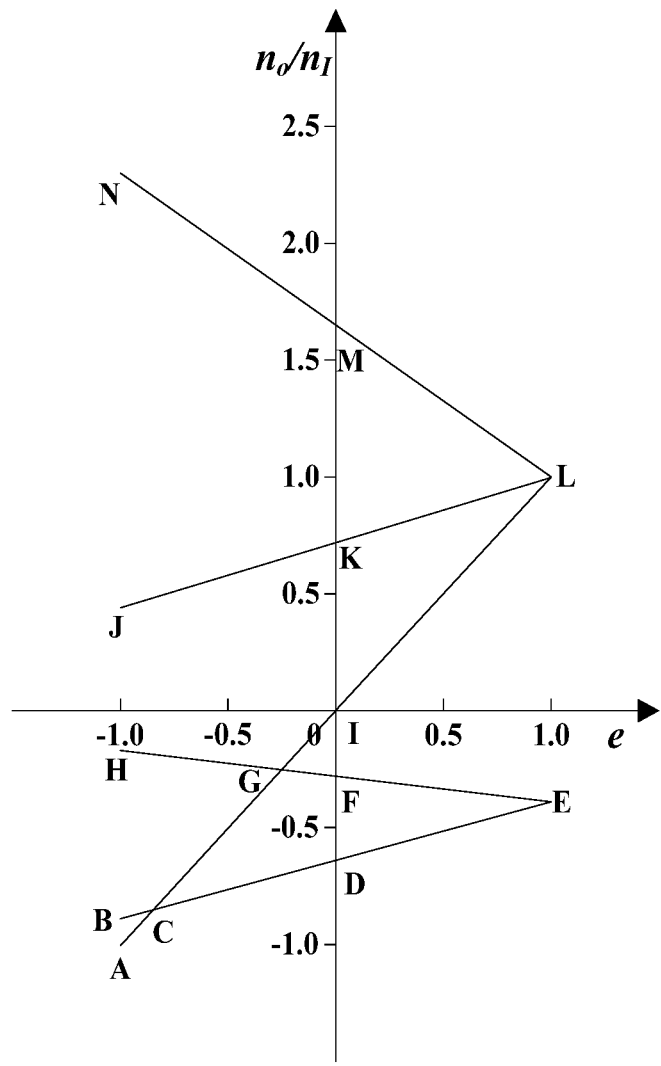
FIG. 8 is a diagram showing relationships between output-input speed ratios and displacement ratios in the present invention.

Relationships between output-input speed ratios and displacement ratios in the present invention are shown in FIG. 8. When $e \in [0, 1.00]$, the speed regulation range in the F(H) gear is $[0, 1.00]n_I$; when $e \in [-1.00, 1.00]$, the speed regulation range in the $F_1$(HM) gear is $[0.44, 1.00]n_I$; when $e \in [-1.00, 1.00]$, the speed regulation range in the $F_2$(HM) gear is $[1.00, 2.28]n_I$; when $e \in [-1.00, 0]$, the speed regulation range in the R(H) gear is $[-1.00, 0]n_I$; and when $e \in [-1.00, 1.00]$, the speed regulation range in the $R_1$(HM) gear is $[-0.39, -0.17]n_I$, and the speed regulation range in the $R_2$(HM) gear is $[-0.89, -0.39]n_I$. The speeds in the $F_1$(M) gear and $F_2$(M) gear are respectively $0.72n_I$ and $1.64n_I$; the speeds in the $R_1$(M) gear and $R_2$(M) gear are respectively $-0.28n_I$ and $-0.64n_I$. When e=1.00, the F(H) gear is shifted to the $F_1$(HM) gear to implement speed regulation without power interruption, and in this case, $n_o = n_I$. When e=1.00, the F(H) gear is shifted to the $F_2$(HM) gear to implement speed regulation without power interruption, and in this case, $n_o = n_I$. When e=1.00, the $F_1$(HM) gear is shifted to the $F_2$(HM) gear to implement speed regulation without power interruption, and in this case, $n_o = n_I$. When e=−0.25, the R(H) gear is shifted to the $R_1$(HM) gear to implement speed regulation without power interruption, and in this case, $n_o = -0.25n_I$. When e=−0.85, the R(H) gear is shifted to the $R_2$(HM) gear to implement speed regulation without power interruption, and in this case, $n_o = -0.85$ nm. When e=1.00, the $R_1$(HM) gear is shifted to the $R_2$(HM) gear to implement speed regulation without power interruption, and in this case, $n_o = -0.39$ nm.

The solenoid directional valve $V_1$ 34, the pilot-operated proportional relief valve $V_2$ 35, and the accumulator $A_1$ 36 are connected to form a first accumulation system. The solenoid directional valve $V_1$ 34 controls the on-off of hydraulic oil, the pilot-operated proportional relief valve $V_2$ 35 controls the system pressure, and the first accumulation system is used alone and is suitable for working conditions with low braking energy.

The solenoid directional valve $V_3$ 37, the pilot-operated proportional relief valve $V_4$ 38, and the accumulator $A_2$ 39 are connected to form a second accumulation system. The solenoid directional valve $V_3$ 37 controls the on-off of hydraulic oil, the pilot-operated proportional relief valve $V_4$ 38 controls the system pressure, and the second accumulation system is used alone and is suitable for working conditions with medium braking energy.

The first accumulation system and the second accumulation system are used together and are suitable for working conditions with large braking energy. In this case, the solenoid directional valve $V_1$ 34 and the solenoid directional valve $V_3$ 37 respectively control the on-off of hydraulic oil in the first accumulation system and the second accumulation system, and the pilot-operated proportional relief valve $V_2$ 35 and the pilot-operated proportional relief valve $V_4$ 38 have the same set pressure.

Figure 9:
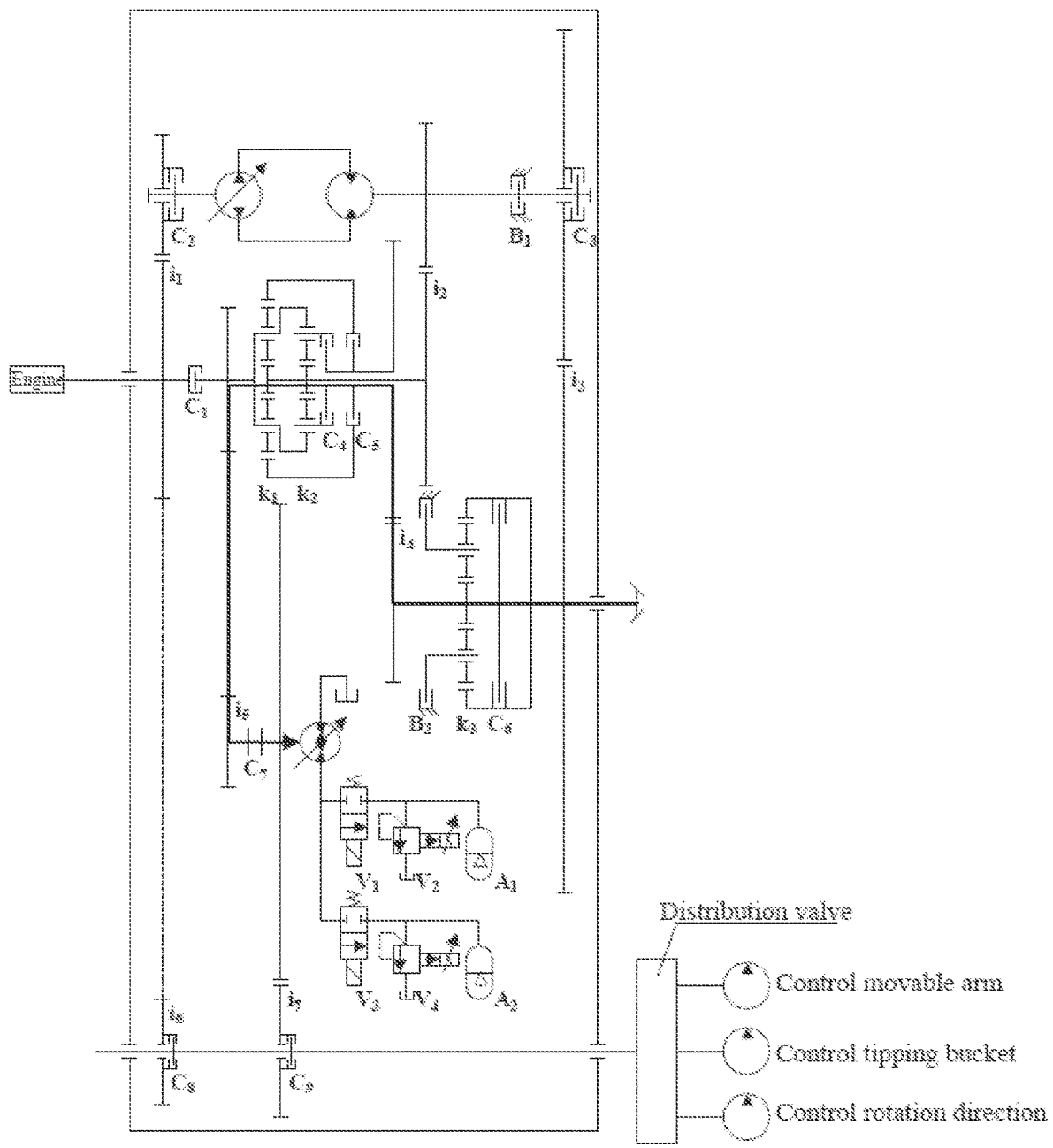
FIG. 9 is a schematic diagram showing the power flow in energy recovery of a transmission mechanism in the present invention.

The power flow in braking energy recovery of the transmission mechanism is shown in FIG. 9. When the output shaft 5 is braked, the rotation direction of the pump/motor mechanism 33 is determined by the convergence mechanism 6; the clutch $C_7$ 32, the brake $B_1$ 88, and the clutch $C_4$ 28 are engaged or the clutch $C_7$ 32, the brake $B_1$ 88, and the clutch $C_5$ 29 are engaged to respectively provide a continuous transmission ratio between the output member and the pump/motor mechanism 33; the braking energy produced by the transmission mechanism is transmitted through the convergence mechanism 6, the mechanical transmission mechanism 2, the transmission mechanism and energy management mechanism gear pair 31, and the clutch $C_7$ 32 to the pump/motor mechanism 33. The solenoid directional valve $V_1$ 34 or the solenoid directional valve $V_3$ 37 is selectively controlled alone to input, into the accumulator $A_1$ 36 or the accumulator $A_2$ 39, the energy produced when the output member is braked. The capacity of the accumulator $A_1$ 36 or the accumulator $A_2$ 39 is respectively controlled by the pilot-operated proportional relief valve $V_2$ 35 or the pilot-operated proportional relief valve $V_4$ 38. The solenoid directional valve $V_1$ 34 and the solenoid directional valve $V_3$ 37 are selectively controlled together to input, into the accumulator $A_1$ 36 and the accumulator $A_2$ 39, the energy produced when the output member is braked. In this case, the pilot-operated proportional relief valve $V_2$ 35 and the pilot-operated proportional relief valve $V_4$ 38 have the same set value and determine the capacities of the accumulator $A_1$ 36 and the accumulator $A_2$ 39.

Figure 10:
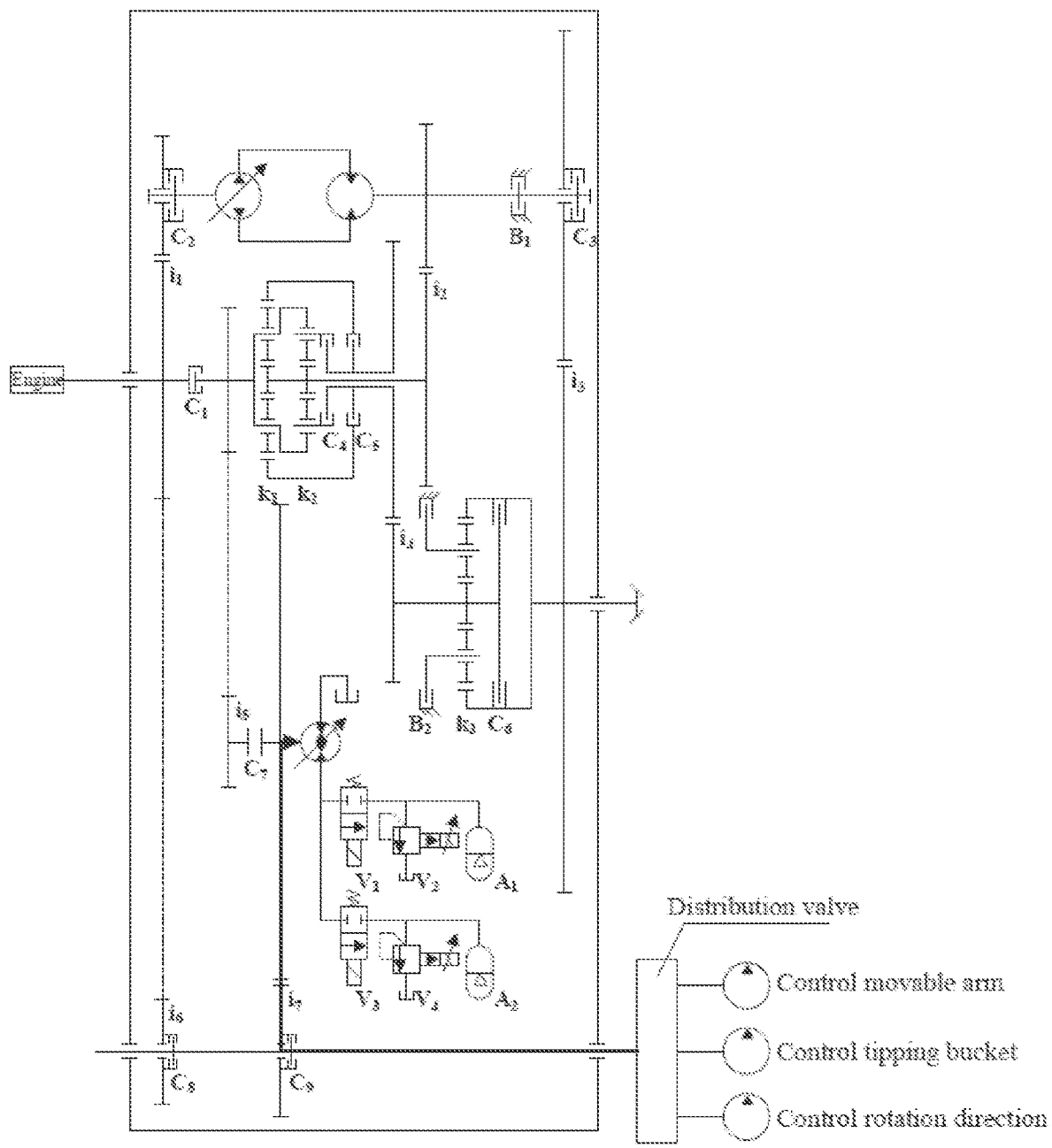
FIG. 10 is a schematic diagram showing the power flow in energy recovery of a power output mechanism in the present invention.

The power flow in braking energy recovery of the power output mechanism is shown in FIG. 10. When the power output mechanism 4 is braked, the clutch $C_9$ 311 is engaged, and the braking energy produced by the power output mechanism is transmitted through the clutch $C_9$ 311 and the power output mechanism and energy management mechanism gear pair 310 to the pump/motor mechanism 33. The solenoid directional valve $V_1$ 34 or the solenoid directional valve $V_3$ 37 is selectively controlled alone to input, into the accumulator $A_1$ 36 or the accumulator $A_2$ 39, the energy produced when the power output mechanism 4 is braked. The capacity of the accumulator $A_1$ 36 or the accumulator $A_2$ 39 is respectively controlled by the pilot-operated proportional relief valve $V_2$ 35 or the pilot-operated proportional relief valve $V_4$ 38. The solenoid directional valve $V_1$ 34 and the solenoid directional valve $V_3$ 37 are selectively controlled together to input, into the accumulator $A_1$ 36 and the accumulator $A_2$ 39, the energy produced when the power output mechanism 4 is braked. In this case, the pilot-operated proportional relief valve $V_2$ 35 and the pilot-operated proportional relief valve $V_4$ 38 have the same set value and determine the capacities of the accumulator $A_1$ 36 and the accumulator $A_2$ 39.

Figure 11:
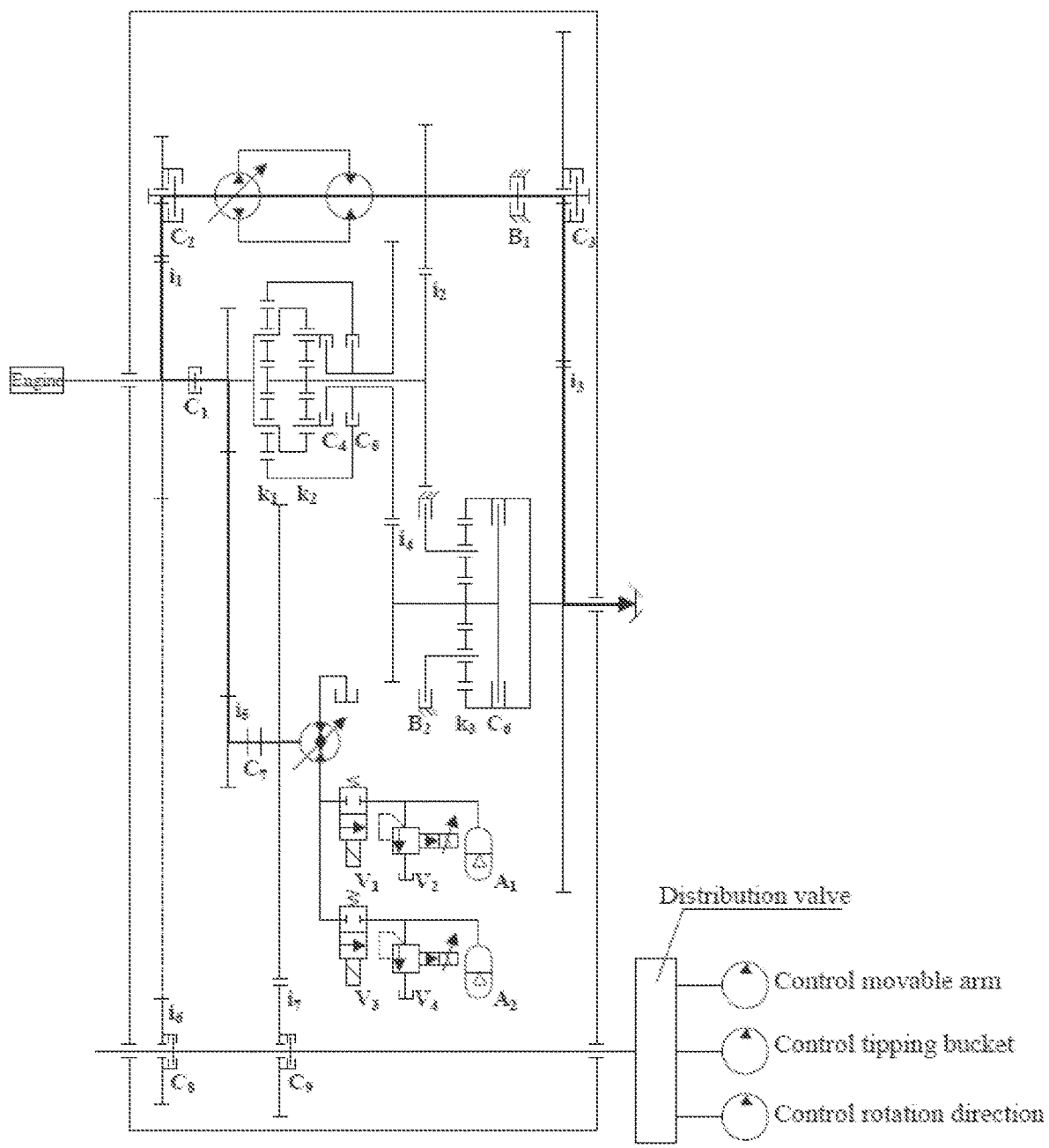
FIG. 11 is a schematic diagram showing the power flow when an energy management mechanism drives the transmission mechanism alone in the present invention.

The power flow when the energy management mechanism drives the transmission mechanism alone is shown in FIG. 11. In this case, only the clutch $C_1$ 21, the clutch $C_2$ 81, the clutch $C_3$ 72, and the clutch $C_7$ 32 need to be engaged, and power output by the energy management mechanism 3 passes through the transmission mechanism and energy management mechanism gear pair 31, the input shaft 1, the hydraulic transmission mechanism 8, and the start mechanism 7 and is output from the output shaft 5.

Figure 12:
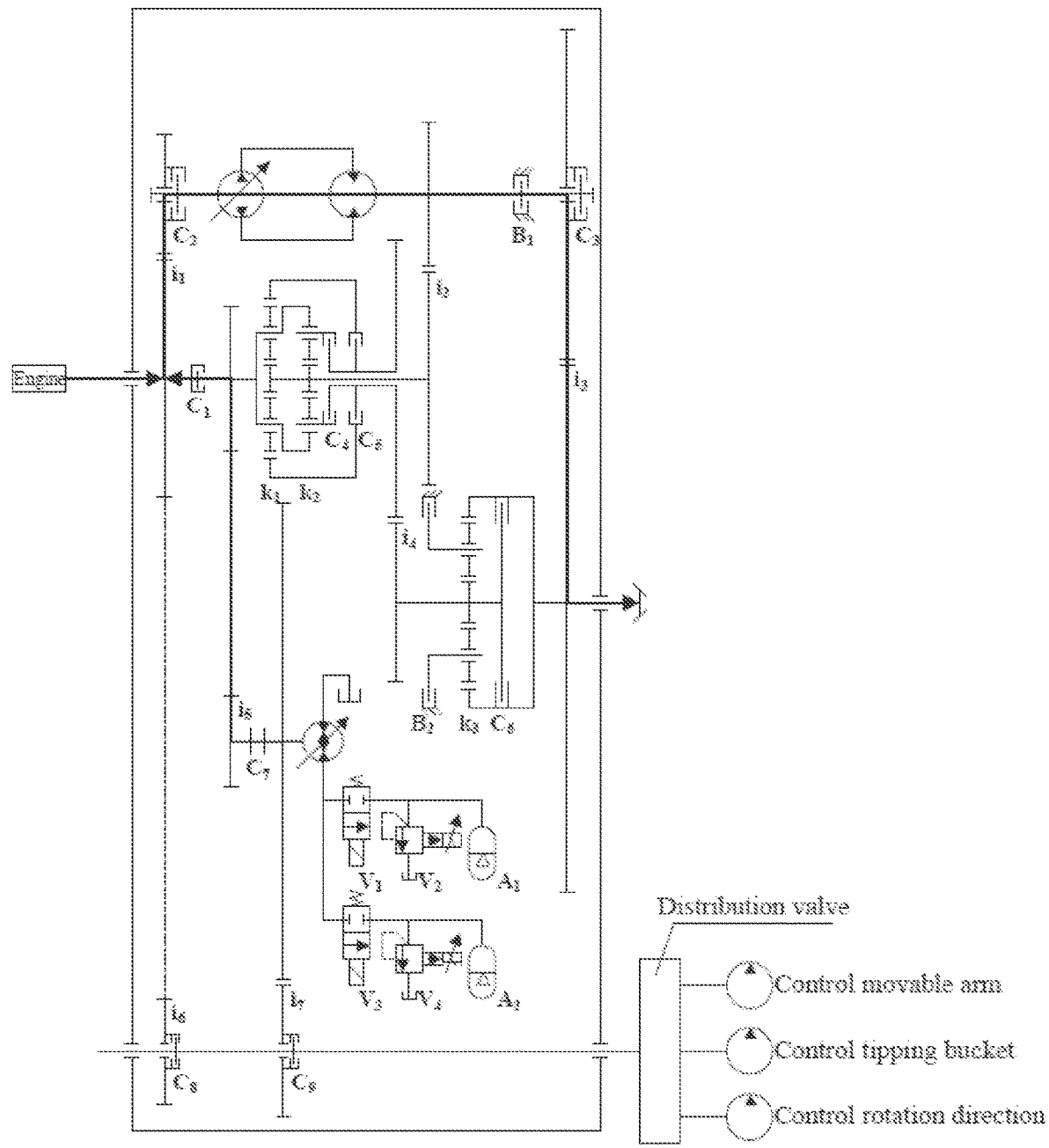
FIG. 12 is a schematic diagram showing the power flow when the energy management mechanism and an engine together drive the transmission mechanism in the present invention.

The power flow when the energy management mechanism and the engine together drive the transmission mechanism is shown in FIG. 12. In this case, only the clutch $C_1$ 21, the clutch $C_2$ 81, the clutch $C_5$ 72, and the clutch $C_7$ 32 need to be engaged, and power output by the energy management mechanism 3 passes through the transmission mechanism and energy management mechanism gear pair 31 and is converged with the engine power transmitted to the input shaft 1. Then, the power passes through the hydraulic transmission mechanism 8 and the start mechanism 7 and is output from the output shaft 5.

Figure 13:
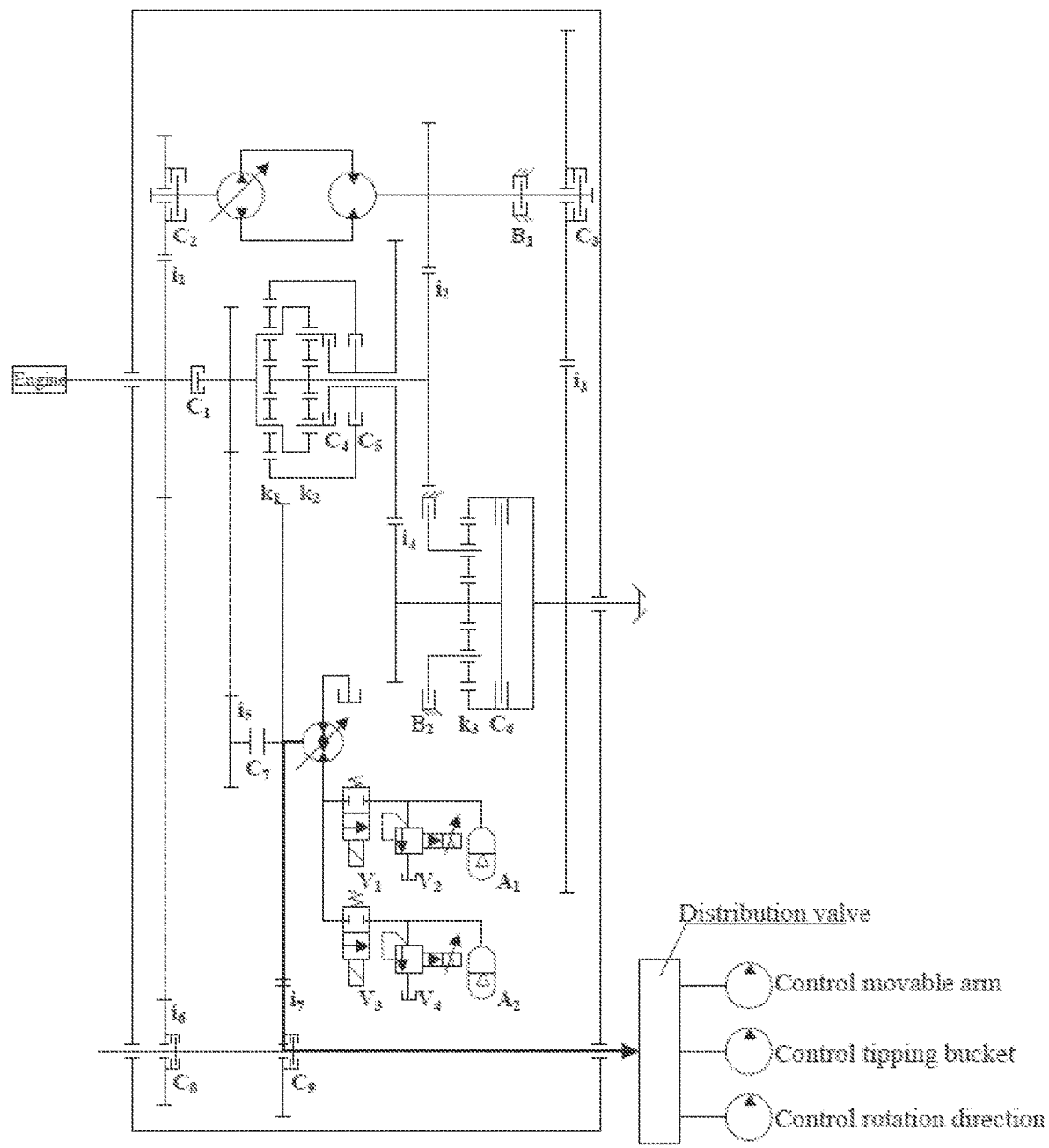
FIG. 13 is a schematic diagram showing the power flow when the energy management mechanism drives the power output mechanism alone in the present invention.

The power flow when the energy management mechanism drives the power output mechanism alone is shown in FIG. 13. In this case, only the clutch $C_9$ 311 needs to be engaged, and power output by the energy management mechanism 3 passes through the power output mechanism and energy management mechanism gear pair 310 and the clutch $C_9$ 311 and is output from the power output shaft 43.

Figure 14:
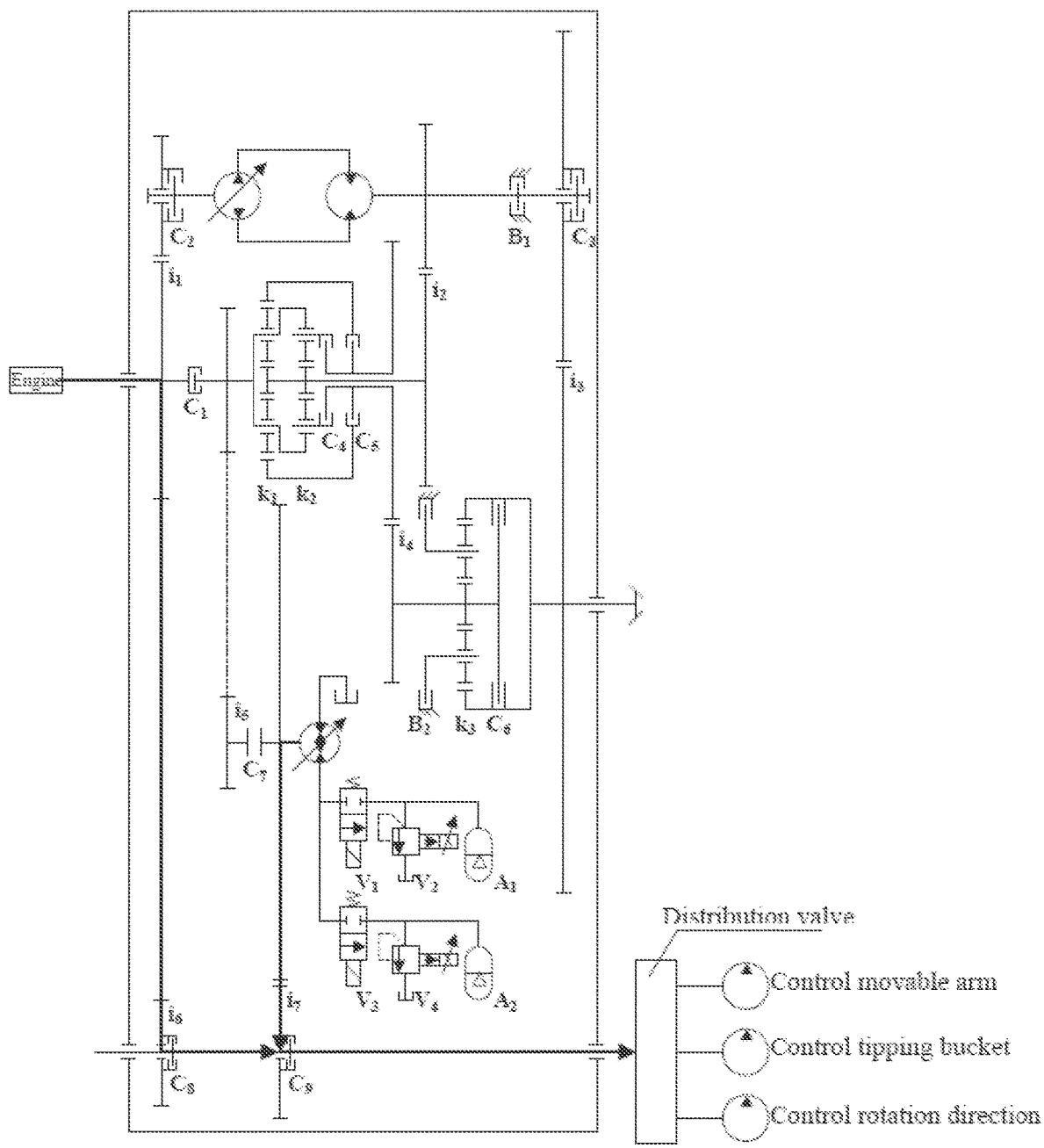
FIG. 14 is a schematic diagram showing the power flow when the energy management mechanism and the engine together drive the power output mechanism in the present invention.

The power flow when the energy management mechanism and the engine together drive the power output mechanism is shown in FIG. 14. In this case, only the clutch $C_8$ 42 and the clutch $C_9$ 311 need to be engaged, and power output by the energy management mechanism 3 passes through the transmission mechanism and energy management mechanism gear pair 31 and the clutch $C_9$ 311 and is converged with the engine power transmitted through the power output gear pair 41 and the clutch Ca 42 to the power output shaft 43. Then, the power is output from the power output shaft 43.

The solenoid directional valve $V_1$ 34 or the solenoid directional valve $V_3$ 37 is selectively controlled alone to release energy stored in the accumulator $A_1$ 36 or the accumulator $A_2$ 39 respectively. In this case, the input oil pressure of the pump/motor mechanism 33 is controlled by the pilot-operated proportional relief valve $V_2$ 35 or the pilot-operated proportional relief valve $V_4$ 38. The solenoid directional valve $V_1$ 34 and the solenoid directional valve V; 37 are selectively controlled together to release energy stored in the accumulator $A_1$ 36 and the accumulator $A_2$ 39 at the same time. In this case, the pilot-operated proportional relief valve $V_2$ 35 and the pilot-operated proportional relief valve $V_4$ 38 have the same set value of the oil pressure and together determine the input oil pressure of the pump/motor mechanism 33.

Figure 15:
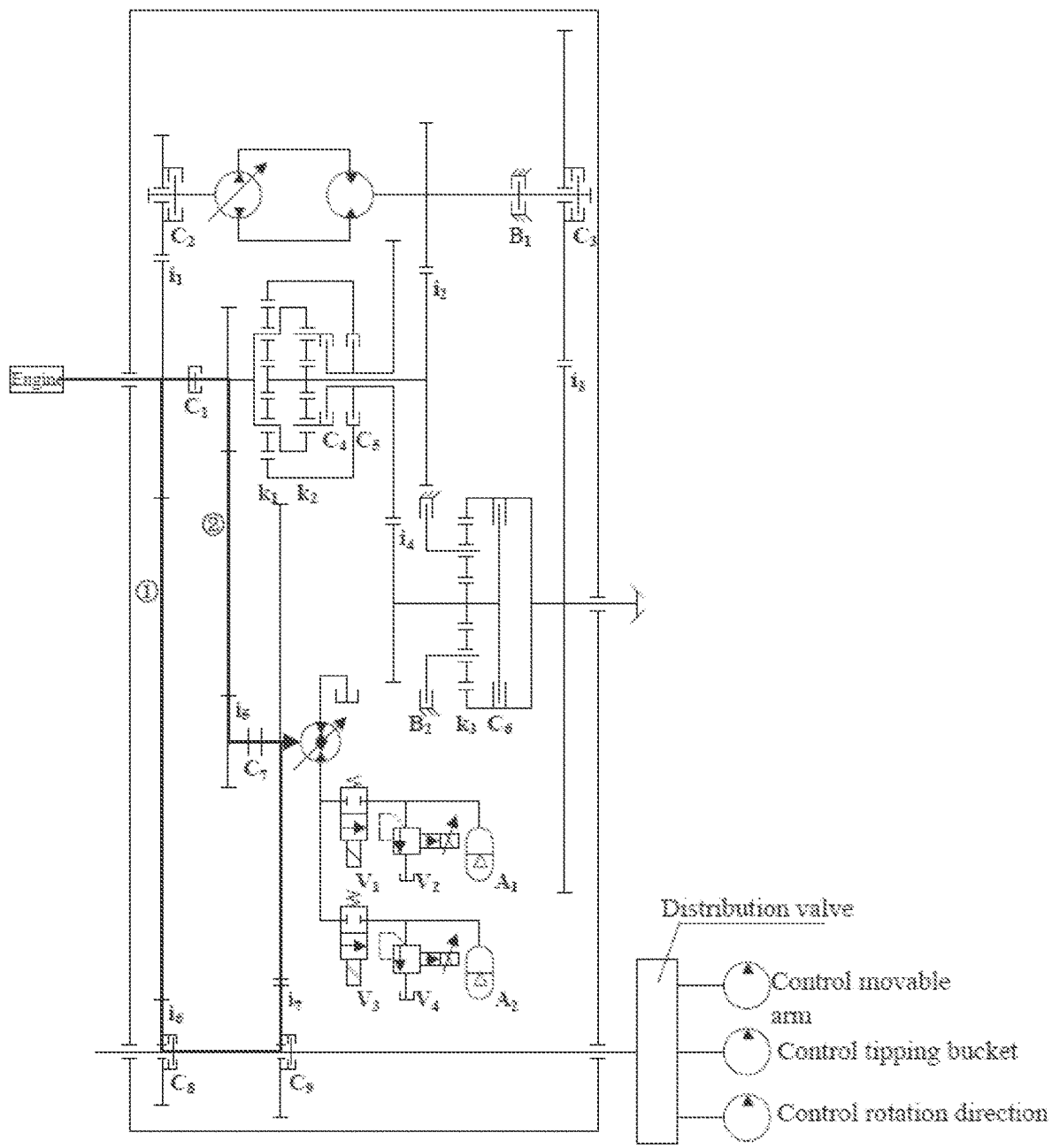
FIG. 15 is a schematic diagram showing the power flow when the energy management mechanism stores energy from the engine in the present invention.

The power flow when the energy management mechanism stores energy from the engine is shown in FIG. 15. Two manners are provided: in a first manner, the clutch $C_8$ 42 and the clutch $C_9$ 311 are engaged, the engine power is transmitted through the power output gear pair 41, the clutch $C_8$ 42, the clutch $C_9$ 311, and the power output mechanism and energy management mechanism gear pair 310 to the energy management mechanism 3, and in this case, the pump/motor mechanism 33 rotates in the same direction as the engine; while in a second manner, the clutch $C_1$ 21 and the clutch $C_7$ 32 are engaged, the engine power is transmitted through the transmission mechanism and energy management mechanism gear pair 31 and the clutch $C_7$ 32 to the energy management mechanism 3, and in this case, the pump/motor mechanism 33 rotates in an opposite direction from the engine. The solenoid directional valve $V_1$ 34 or the solenoid directional valve $V_3$ 37 is selectively controlled alone to input the energy transmitted by the engine into the accumulator $A_1$ 36 or the accumulator $A_2$ 39. In this case, the capacity of the accumulator $A_1$ 36 or the accumulator $A_2$ 39 is respectively controlled by the pilot-operated proportional relief valve $V_2$ 35 or the pilot-operated proportional relief valve $V_4$ 38. The solenoid directional valve $V_1$ 34 and the solenoid directional valve $V_3$ 37 are selectively controlled together to input, into the accumulator $A_1$ 36 and the accumulator $A_2$ 39, the energy produced when the input shaft 1 is braked. In this case, the pilot-operated proportional relief valve $V_2$ 35 and the pilot-operated proportional relief valve $V_4$ 38 have the same set value and determine the capacities of the accumulator $A_1$ 36 and the accumulator $A_2$ 39.

The above descriptions are preferred embodiments of the present invention, and are not intended to limit the present invention. Any obvious improvements, replacements, or modifications made by persons skilled in the art without departing from the essence of the present invention shall fall within the protection scope of the present invention.

What is claimed is:

1. A hydro-mechanical hybrid transmission device with an energy management mechanism, comprising
    an input member,
    a mechanical transmission mechanism,
    the energy management mechanism,
    a power output mechanism,
    an output member,
    a convergence mechanism,
    a start mechanism,
    a hydraulic transmission mechanism,
    a clutch assembly, and
    a brake assembly,
    wherein
    the clutch assembly connects the input member to the mechanical transmission mechanism, the power output mechanism, and the hydraulic transmission mechanism,
    the clutch assembly connects an output of the hydraulic transmission mechanism to the mechanical transmission mechanism and the output member, the clutch assembly connects an output of the mechanical transmission mechanism to the convergence mechanism, the clutch assembly connects the output member to the convergence mechanism, and the clutch assembly connects the energy management mechanism to the mechanical transmission mechanism and the power output mechanism;

the clutch assembly and the brake assembly provide a continuous transmission ratio between the input member and the output member or the power output mechanism, the clutch assembly and the brake assembly provide a continuous transmission ratio between the energy management mechanism and the output member or the power output mechanism, and the clutch assembly and the brake assembly provide a continuous transmission ratio between the energy management mechanism together with the input member and the output member or the power output mechanism, transmission modes comprising hydraulic transmission, hydro-mechanical transmission, and mechanical transmission are provided between the input member and the output member by adjusting a displacement ratio of the hydraulic transmission mechanism and selectively controlling an engagement of the clutch assembly and the brake assembly;

the mechanical transmission mechanism comprises a front planetary gear mechanism and a middle planetary gear mechanism, wherein a planet carrier of the front planetary gear mechanism is connected to the input member, the planet carrier of the front planetary gear mechanism is connected to a ring gear of the middle planetary gear mechanism, a sun gear of the front planetary gear mechanism is connected to a sun gear of the middle planetary gear mechanism, the sun gear of the middle planetary gear mechanism is connected to an output end of the hydraulic transmission mechanism;

the convergence mechanism comprises a rear planetary gear mechanism, wherein a ring gear of the rear planetary gear mechanism is connected to the output member, the clutch assembly connects a ring gear of the front planetary gear mechanism or a planet carrier of the middle planetary gear mechanism to a sun gear of the rear planetary gear mechanism;

the clutch assembly comprises a first clutch and a second clutch; wherein the first clutch is used for selectively connecting an input end of the hydraulic transmission mechanism to the input member to implement a second synchronous rotation;

the second clutch is used for selectively connecting the output end of the hydraulic transmission mechanism to the output member to implement a third synchronous rotation; and a continuous forward hydraulic transmission or a continuous reverse hydraulic transmission is provided between the input member and the output member by adjusting the displacement ratio of the hydraulic transmission mechanism and selectively controlling an engagement of the first clutch and the second clutch.

2. The hydro-mechanical hybrid transmission device with the energy management mechanism according to claim 1, wherein the clutch assembly further comprises a third clutch, a fourth clutch, a fifth clutch, and a sixth clutch;

the third clutch is used for selectively connecting the input member to the planet carrier of the front planetary gear mechanism to implement a first synchronous rotation;

the fourth clutch is used for selectively connecting the planet carrier of the middle planetary gear mechanism to the sun gear of the rear planetary gear mechanism to implement a fourth synchronous rotation;

the fifth clutch is used for selectively connecting the ring gear of the front planetary gear mechanism to the sun gear of the rear planetary gear mechanism to implement a fifth synchronous rotation;

the sixth clutch is used for selectively connecting the ring gear of the rear planetary gear mechanism to the sun gear of the rear planetary gear mechanism to implement a sixth synchronous rotation;

the brake assembly comprises a second brake, and the second brake is used for selectively connecting a planet carrier of the rear planetary gear mechanism to a fixed member; and continuous forward hydro-mechanical transmission or continuous reverse hydro-mechanical transmission is provided between the input member and the output member by adjusting the displacement ratio of the hydraulic transmission mechanism and selectively controlling an engagement of the third clutch, the first clutch, the fourth clutch, the fifth clutch, the sixth clutch, and the second brake.

3. The hydro-mechanical hybrid transmission device with the energy management mechanism according to claim 2, wherein the third clutch, the first clutch, the fourth clutch, and the sixth clutch are engaged, the third clutch, the first clutch, the fifth clutch, and the sixth clutch are engaged, the third clutch, the first clutch, the fourth clutch, and the second brake are engaged, and the third clutch, the first clutch, the fifth clutch, and the second brake are engaged, to respectively provide different forward or reverse hydro-mechanical transmission between the input member and the output member.

4. The hydro-mechanical hybrid transmission device with the energy management mechanism according to claim 2, wherein the brake assembly further comprises a first brake;

the first brake is used for selectively connecting the output end of the hydraulic transmission mechanism to the fixed member; and the third clutch, the fourth clutch, the sixth clutch, and the first brake are engaged, the third clutch, the fifth clutch, the sixth clutch, and the first brake are engaged, the third clutch, the fourth clutch, the first brake, and the second brake are engaged, and the third clutch, the fifth clutch, the first brake, and the second brake are engaged, to respectively provide different forward or reverse mechanical transmission between the input member and the output member.

5. The hydro-mechanical hybrid transmission device with the energy management mechanism according to claim 4, wherein the energy management mechanism comprises a pump/motor mechanism, a first solenoid directional valve, a second pilot-operated proportional relief valve, a first accumulator, a third solenoid directional valve, a fourth pilot-operated proportional relief valve, and a second accumulator;

the pump/motor mechanism is connected to the first accumulator and the second accumulator;

the first solenoid directional valve is used for controlling the pump/motor mechanism to be connected to the first accumulator, the second pilot-operated proportional relief valve is mounted between the pump/motor mechanism and the first accumulator, the third solenoid directional valve is used for controlling the pump/motor mechanism to be connected to the second accumulator, and the fourth pilot-operated proportional relief valve is mounted between the pump/motor mechanism and the second accumulator;

the clutch assembly further comprises a seventh clutch, an eighth clutch, and a ninth clutch, the seventh clutch is used for selectively connecting the pump/motor mechanism to the planet carrier of the front planetary gear mechanism to implement a seventh synchronous rotation;

the ninth clutch is used for selectively connecting the pump/motor mechanism to the power output mechanism to implement a ninth synchronous rotation; and the eighth clutch is used for selectively connecting the input member to the power output mechanism to implement an eighth synchronous rotation.

6. The hydro-mechanical hybrid transmission device with the energy management mechanism according to claim 5, wherein when the output member is braked, the seventh clutch, the first brake, and the fourth clutch are engaged, or the seventh clutch, the first brake, and the fifth clutch are engaged, to respectively provide a continuous transmission ratio between the output member and the pump/motor mechanism; and the first solenoid directional valve and the third solenoid directional valve are selectively controlled to input, into the first accumulator or/and the second accumulator, energy produced when the output member is braked; and when the power output mechanism is braked, the ninth clutch is engaged to provide a continuous transmission ratio between the power output mechanism and the pump/motor mechanism; and the first solenoid directional valve and the third solenoid directional valve are selectively controlled to input, into the first accumulator or/and the second accumulator, energy produced when the power output mechanism is braked.

7. The hydro-mechanical hybrid transmission device with the energy management mechanism according to claim 5, wherein the first solenoid directional valve and/or the third solenoid directional valve are selectively controlled to make the first accumulator or/and the second accumulator serve as an output of the energy management mechanism;

the first clutch, the second clutch, the third clutch, and the seventh clutch are engaged to provide a continuous transmission ratio between the energy management mechanism and the output member and provide a continuous transmission ratio between the energy management mechanism together with the input member and the output member;

the ninth clutch is engaged to provide a continuous transmission ratio between the energy management mechanism and the power output mechanism; and the eighth clutch and the ninth clutch are engaged to provide a continuous transmission ratio between the energy management mechanism together with the input member and the power output mechanism.

8. The hydro-mechanical hybrid transmission device with the energy management mechanism according to claim 5, wherein the eighth clutch and the ninth clutch are engaged and the third clutch and the seventh clutch are engaged to respectively provide a continuous transmission ratio between the input member and the pump/motor mechanism; and the first solenoid directional valve and the third solenoid directional valve are selectively controlled to input energy of the input member into the first accumulator or/and the second accumulator.

* * * * *